US012665517B2

(12) United States Patent
Dey et al.

(10) Patent No.: US 12,665,517 B2
(45) Date of Patent: Jun. 23, 2026

(54) EFFICIENCY IN A DUAL-ACTIVE BRIDGE OF A DC-DC STAGE

(71) Applicant: Atieva, Inc., Newark, CA (US)

(72) Inventors: Saikat Dey, Tempe, AZ (US); Yukun Luo, Sunnyvale, CA (US); Shan Chai, Fremont, CA (US)

(73) Assignee: Atieva, Inc., Newark, CA (US)

( * ) Notice: Subject to any disclaimer, the term of this patent is extended or adjusted under 35 U.S.C. 154(b) by 257 days.

(21) Appl. No.: 18/526,981

(22) Filed: Dec. 1, 2023

(65) Prior Publication Data

US 2025/0183805 A1     Jun. 5, 2025

(51) Int. Cl.
| | |
|---|---|
| *H02M 3/335* | (2006.01) |
| *B60L 53/22* | (2019.01) |
| *H02M 1/00* | (2006.01) |
| *H02M 1/08* | (2006.01) |
| *H02M 1/088* | (2006.01) |

(52) U.S. Cl.
CPC ......... *H02M 3/33515* (2013.01); *B60L 53/22* (2019.02); *H02M 1/0058* (2021.05); *H02M 1/083* (2013.01); *H02M 1/088* (2013.01); *H02M 3/33573* (2021.05); *H02M 3/33576* (2013.01); *H02M 3/33584* (2013.01); *H02J 2207/20* (2020.01)

(58) Field of Classification Search
CPC ........... H02M 3/33515; H02M 1/0058; H02M 1/083; H02M 1/088; H02M 3/33573; H02M 3/33576; H02M 3/33584; H02M 3/335; B60L 53/22; H02J 2207/20; Y02T 10/70; Y02T 10/7072
See application file for complete search history.

(56) References Cited

U.S. PATENT DOCUMENTS

| | | | |
|---|---|---|---|
| 8,803,485 B2 | 8/2014 | Chuang et al. | |
| 8,884,658 B2 | 11/2014 | Tang et al. | |
| 10,562,404 B1 * | 2/2020 | Khaligh ................. | H02M 1/12 |
| 10,840,820 B2 * | 11/2020 | Yang ................... | H02M 3/1582 |
| 11,165,349 B2 * | 11/2021 | Mu ......................... | H02M 1/10 |
| 11,658,563 B2 | 5/2023 | Biskup et al. | |
| 12,107,454 B1 * | 10/2024 | Namuduri ............... | H02J 7/342 |
| 12,341,440 B2 | 6/2025 | Reis et al. | |
| 12,348,148 B2 * | 7/2025 | Wu ................... | H02M 3/33576 |
| 12,370,914 B2 * | 7/2025 | D'Authier .............. | B60L 53/22 |

(Continued)

FOREIGN PATENT DOCUMENTS

| | | |
|---|---|---|
| CA | 3041876 A1 | 11/2020 |

OTHER PUBLICATIONS

International Search Report and Written Opinion for PCT Application No. PCT/US2024/057283, mailed on Mar. 12, 2025, 18 pages.

(Continued)

*Primary Examiner* — Yusef A Ahmed

(74) *Attorney, Agent, or Firm* — Brake Hughes Bellermann LLP

(57)            ABSTRACT

A method comprises: providing, in an onboard charger of an electric vehicle, a direct current (DC) to DC stage including a dual-active bridge having switches arranged in multiple legs, each of the multiple legs controlled by a corresponding one of pulse width modulation (PWM) signals; and dynamically modulating the PWM signals to improve zero voltage switching (ZVS) in the onboard charger.

21 Claims, 16 Drawing Sheets

(56) References Cited

U.S. PATENT DOCUMENTS

| | | | | |
|---|---|---|---|---|
| 12,395,059 | B2 * | 8/2025 | Ammanamchi | ........................... H02M 1/4208 |
| 2012/0014138 | A1 * | 1/2012 | Ngo | .................. H02M 3/33584 363/17 |
| 2013/0057200 | A1 * | 3/2013 | Potts | ........................ H02J 50/12 320/107 |
| 2016/0016479 | A1 * | 1/2016 | Khaligh | .............. H02M 1/4258 336/170 |
| 2018/0076723 | A1 * | 3/2018 | Li | ........................ H02M 3/3378 |
| 2018/0222333 | A1 * | 8/2018 | Khaligh | .............. H02M 1/4258 |
| 2020/0324665 | A1 * | 10/2020 | Mackenzie | ............. B60L 53/22 |
| 2021/0028712 | A1 * | 1/2021 | Yu | ............................ H01F 30/16 |
| 2021/0155100 | A1 * | 5/2021 | Khaligh | .................. B60L 55/00 |
| 2021/0399628 | A1 * | 12/2021 | Yeo | .......................... H02M 1/36 |
| 2022/0045618 | A1 * | 2/2022 | Kumar | .................... H02J 7/007 |
| 2022/0161673 | A1 * | 5/2022 | Jimenez Pino | ..... H02M 1/4208 |
| 2022/0286057 | A1 * | 9/2022 | Zhang | ..................... B60L 58/20 |
| 2022/0321016 | A1 * | 10/2022 | Khaligh | ............ H02M 3/33561 |
| 2022/0337166 | A1 * | 10/2022 | Chan | ...................... H02M 1/007 |
| 2022/0360178 | A1 * | 11/2022 | Park | .................... H02M 1/4233 |
| 2022/0385087 | A1 * | 12/2022 | Sarnago Andia | . H02M 3/33584 |
| 2023/0066489 | A1 * | 3/2023 | Zou | .......................... H02J 7/007 |
| 2023/0137396 | A1 | 5/2023 | Mu et al. | |
| 2023/0307918 | A1 | 9/2023 | Ginart et al. | |
| 2023/0318468 | A1 * | 10/2023 | Meghnous | .............. B60L 53/30 320/109 |
| 2023/0327565 | A1 * | 10/2023 | Zhang | ........................ B60L 1/02 307/19 |
| 2023/0361671 | A1 * | 11/2023 | Ou | ....................... H02M 1/0058 |
| 2023/0387816 | A1 * | 11/2023 | Mallik | ................ H02M 1/0064 |
| 2024/0039413 | A1 * | 2/2024 | Danekar | .............. H02J 7/0047 |
| 2024/0154534 | A1 * | 5/2024 | Shi | ..................... H02M 3/33573 |
| 2024/0186883 | A1 * | 6/2024 | Shi | ....................... H02M 1/0058 |
| 2024/0204675 | A1 * | 6/2024 | Wu | ......................... H02M 1/38 |
| 2024/0223097 | A1 * | 7/2024 | Zayed | ........................ H02J 7/02 |
| 2024/0297598 | A1 * | 9/2024 | Divan | ................... H02M 3/335 |
| 2024/0405693 | A1 * | 12/2024 | Reis | ...................... H02M 1/007 |
| 2024/0413759 | A1 * | 12/2024 | Kawai | ............... H02M 3/33573 |
| 2025/0183805 | A1 | 6/2025 | Dey et al. | |
| 2025/0183810 | A1 * | 6/2025 | Dey | ...................... H02M 1/083 |

OTHER PUBLICATIONS

Barth, et al., "Soft Start-Up Current Control of an LCC-S Compensated Inductive Charging System", 2022 7th IEEE International Energy Conference (ENERGYCON 2022), 2022, 6 pages.

Li, et al., "A SIC Bidirectional LLC On-Board Charger", IEEE, 2019, pp. 3353-3360.
Mallik, et al., "Maximum Efficiency Tracking of an Integrated Two-Staged AC-DC Converter Using Variable DC-Link Voltage", IEEE Transactions on Industrial Electronics, vol. 65, No. 11, Nov. 2018, pp. 8408-8421.
Wang, et al., "A Novel Approach To Design EV Battery Chargers Using Sepic PFC Stage and Optimal Operating Point Tracking Technique for LLC Converter", IEEE, 2014, pp. 1683-1689.
International Search Report and Written Opinion for PCT Application No. PCT/US2024/057282, mailed on Mar. 25, 2025, 20 pages.
Park, et al., "DAB Converter For EV Onboard Chargers Using Bare-Die SIC MOSFETS and Lealage-Integrated Planar Transfomer", IEEE Transaction on Transportation Electrification, Vol. 8, No. 1, Mar. 2022, 16 pages
Wu, et al., "A Control Strategy For Wide-Voltage Output CLLC Converter in On-Board Chargers", 2023 IEEE 6th International Electrical and Energy Conference (CIEEC), 2023, pp. 3300-3305.
M. Pahlevani et al: "Soft-Switching Power Electronics Technology for Electric Vehicles: A Technology Review," in IEEE Journal of Emerging and Selected Topics in Industrial Electronics, vol. 1, No. 1, Jul. 2020, pp. 80-90, doi: 10.1109/JESTIE.2020.2999590.
S. Shah et al.: "Control of Active Component of Current in Dual Active Bridge Converter," 2018 IEEE Applied Power Electronics Conference and Exposition (APEC), Mar. 2018, pp. 323-330.
Texas Instruments: "Design Guide: TIDA-010054 Bidirectional, Dual Active Bridge Reference Design for Level 3 Electric Vehicle Charging Stations," TIDUESOC—Jun. 2019—Revised Jul. 2022, 86 pages.
V. M. Iyer et al.: "Variable DC bus control for a bidirectional on-board electric vehicle charger," 2017 IEEE 6th International Conference on Renewable Energy Research and Applications (ICRERA), San Diego, CA, USA, 2017, pp. 1041-1046.
Y. Yan et al.: "Building Common-Mode Analytical Model for Dual Active Bridge Incorporating with Different Modulation Strategies," IEEE Transactions on Power Electronics, vol. 36, No. 11, Nov. 2021, pp. 12608-12619.
Z. Wang et al.: "Influence of Junction-Capacitance and Dead-Time on Dual-Active-Bridge Actual Soft-Switching-Range: Analytic Analysis and Solution," in IEEE Transactions on Power Electronics, vol. 38, No. 5, May 2023, pp. 6157-6168.
Y. Yan et al.: "Securing Full-Power-Range Zero-Voltage Switching in Both Steady-State and Transient Operations for a Dual-Active-Bridge-Based Bidirectional Electric Vehicle Charger," in IEEE Transactions on Power Electronics, vol. 35, No. 7, Jul. 2020, pp. 7506-7519.

* cited by examiner

1200

1202 time(t)

1600

| | | Battery voltage 1602 | | | |
|---|---|---|---|---|---|
| | | 1602-1 | 1602-2 | ... | 1602-*n* |
| Battery current 1604 | 1604-1 | | | | |
| | 1604-2 | | 1606 | | |
| | ... | | | | |
| | 1604-*m* | | | | |

FIG. 16

EFFICIENCY IN A DUAL-ACTIVE BRIDGE OF A DC-DC STAGE

TECHNICAL FIELD

This document relates to improving the efficiency in a dual-active bridge of a DC-DC stage.

BACKGROUND

In recent years, the world's transportation has begun a transition away from powertrains primarily driven by fossil fuels and toward more sustainable energy sources. The majority of such increasingly prevalent powertrains include electric motors powered by on-board energy storages. The efficiency of the powertrain is an important performance characteristic of the vehicle as a whole.

SUMMARY

In a first aspect, a method comprises: providing, in an onboard charger of an electric vehicle, a direct current (DC) to DC stage including a dual-active bridge having switches arranged in multiple legs, each of the multiple legs controlled by a corresponding one of pulse width modulation (PWM) signals; and dynamically modulating the PWM signals to improve zero voltage switching (ZVS) in the onboard charger.

Implementations can include any or all of the following features. Dynamically modulating the PWM signals comprises changing phase shifts of the PWM signals. Changing the phase shifts comprises single-phase shift modulation. Changing the phase shifts comprises dual-phase shift modulation. Changing the phase shifts comprises triple-phase shift modulation. Dynamically modulating the PWM signals corresponds to a buck mode operation at a light load. Dynamically modulating the PWM signals corresponds to a buck mode operation at a medium load. Dynamically modulating the PWM signals corresponds to a buck mode operation at a high load. Dynamically modulating the PWM signals corresponds to a boost mode operation at a light load. The method is performed as part of converting alternating current to DC for charging a battery onboard the vehicle. The method is performed as part of converting DC to AC for a power transfer operation selected from the group consisting of: a vehicle-to-load operation, a vehicle-to-home operation, a vehicle-to-grid operation, and a vehicle-to-vehicle operation. Improving the ZVS comprises creating an additional ZVS zone within a voltage range of a battery of the vehicle. The onboard charger includes a DC link capacitor having a DC bus voltage, the method further comprising dynamically regulating the DC bus voltage to further improve the ZVS. Dynamically regulating the DC bus voltage comprises ensuring that the DC bus voltage is within the additional ZVS zone. The onboard charger includes a DC link capacitor having a DC bus voltage, the method further comprising dynamically regulating the DC bus voltage to further improve the ZVS. Dynamically regulating the DC bus voltage comprises performing a comparison of a sensed battery current with a battery current threshold, and selecting the DC bus voltage based on the comparison. The method further comprises setting the battery current threshold before performing the comparison. The battery current threshold is set based on a boundary condition where a minimum transferred power is required to achieve a ZVS condition in a buck mode operation at a medium load. If the comparison indicates that the sensed battery current is greater than the battery current threshold, selecting the DC bus voltage comprises setting the DC bus voltage equal to a battery voltage. If the comparison indicates that the sensed battery current is equal to or lower than the battery current threshold, selecting the DC bus voltage comprises obtaining the DC bus voltage from a lookup table. The lookup table is a two-dimensional table organized according to respective values of i) the sensed battery current or battery power, and ii) a battery voltage.

In a second aspect, an onboard charger for a vehicle comprises: a direct current (DC) to DC stage comprising: a dual-active bridge having switches arranged in multiple legs, each of the multiple legs controlled by a corresponding one of pulse width modulation (PWM) signals; and modulator circuitry for the dual-active bridge, the modulator circuitry configured to dynamically modulate the PWM signals to improve zero voltage switching (ZVS) in the onboard charger.

Implementations can include any or all of the following features. Modulator circuitry dynamically modulates the PWM signals by changing phase shifts of the PWM signals. The onboard charger further comprises an electromagnetic interference filter. The onboard charger further comprises power factor correction circuitry. The onboard charger further comprises: a DC link capacitor having a DC bus voltage; and regulator circuitry configured to dynamically regulate the DC bus voltage to further improve the ZVS. The regulator circuitry dynamically regulates the DC bus voltage by performing a comparison of a sensed battery current with a battery current threshold, and selecting the DC bus voltage based on the comparison. If the comparison indicates that the sensed battery current is greater than the battery current threshold, the regulator circuitry sets the DC bus voltage equal to a battery voltage. The onboard charger further comprises a lookup table, wherein if the comparison indicates that the sensed battery current is equal to or lower than the battery current threshold, the regulator circuitry obtains the DC bus voltage from the lookup table. In a discharging mode of the onboard charger the regulator circuitry comprises the dual-active bridge. The onboard charger further comprises power factor correction circuitry, wherein in a charging mode of the onboard charger the regulator circuitry comprises the power factor correction circuitry.

BRIEF DESCRIPTION OF DRAWINGS

FIG. 16 shows an example of a lookup table that can be used by the DAB control block of FIG. 15.

Like reference symbols in the various drawings indicate like elements.

DETAILED DESCRIPTION

Figure 1:
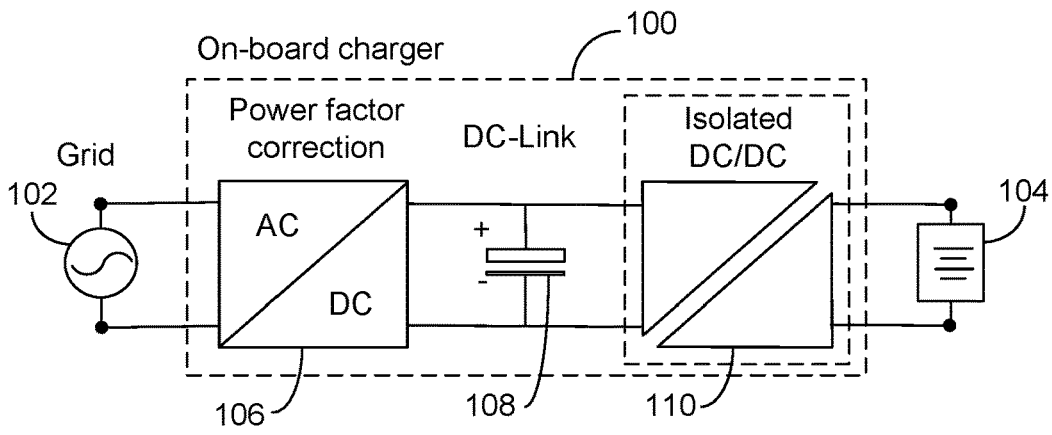
FIG. 1 shows an example of an onboard charger (OBC).

This document describes examples of systems and techniques that improve efficiency in a direct current (DC) to DC stage of an onboard charger in an electric vehicle. Implementations can provide soft-switching modulation of a dual-active-bridge in the DC to DC stage across an entire range of battery voltages (i.e., the soft-switching modulation can be referred to as "full range"). AC charging of a vehicle battery can be improved using the present subject matter. The efficiency of level 1 (L1) and/or level 2 (L2) charging can be increased. This lowers energy loss and reduces charging time. Other operation modes can be improved. The efficiency of vehicle-to-load operation can be increased. Electromagnetic interference (during charging or discharging) can be reduced by operating a DC to DC stage in a soft-switching mode for most or all operating conditions. The increased efficiency and reduced losses can lower the requirements for cooling.

Implementations can perform modulation that dynamically changes the phase shifts in pulse width modulation (PWM) signals for the dual-active-bridge. That is, in a first concept of the present subject matter, efficiency improvement can be accomplished using improved dual-active-bridge modulator circuitry. The first concept may only or primarily target switching losses at the dual-active-bridge, which can be a dominant type of loss at lighter load operations. In some implementations, the modulation can be improved or optimized to achieve full zero-voltage switching (ZVS) during buck mode and/or boost mode operations at a light load. With the battery voltage referred to as $V_{bat}$, and the DC bus voltage referred to as $V_{dc}$, the buck mode can be characterized by $V_{bat} < V_{dc}$, and the boost mode can be characterized by $V_{bat} > V_{dc}$, respectively. Modulation at higher loads (e.g., a medium load and/or a high load) can be kept essentially the same, so that the full load efficiency is substantially unchanged but the light-load efficiency improves significantly. For example, the battery voltage $V_{bat}$ can be kept substantially constant in some implementations of the first concept. Losses in power factor correction circuitry can be unaffected.

Implementations can also or instead provide dynamic intermediate bus voltage regulation. That is, in a second concept in the present subject matter, efficiency improvement can also or instead be accomplished using dynamic DC bus voltage regulation in an alternating current (AC) to AC converter, or in a DC to AC converter, or in a DC to DC converter. This can provide a full-range ZVS operation of a dual-active-bridge. Efficiency can be improved at a light load (e.g., Level 1 charging, or a vehicle-to-load operation) throughout the full range of battery voltage. The dynamically regulated DC bus voltage can be different from the battery voltage to avoid a non-ZVS zone for a given battery voltage. An efficiency across the dual-active-bridge and the power factor correction circuitry can be optimized at a high load-when an output power exceeds a power threshold, or an output current exceeds a current threshold—by regulating the DC bus voltage to be about equal to the battery voltage. In a charging mode, a power factor correction circuitry can dynamically regulate the bus voltage. In a discharging mode, a dual-active-bridge can dynamically regulate the bus voltage.

In today's electric vehicles a key high-voltage operation is the conversion of AC to DC for charging the vehicle's battery. This may be the main type of charging that owners of electric vehicles use (e.g., because they often make use of AC-to-DC charging equipment available in their home or at a public location). The efficiency of the power conversion affects the vehicle's performance in a number of ways, including: charging efficiency, such as how little energy is lost curing charging; charging time, such as how quickly the vehicle can recharge; efficiency of power supply operations such as vehicle-to-load (V2L), vehicle-to-home (V2H), and vehicle-to-vehicle (V2V); and also product life, electromagnetic compatibility, and vehicle range.

In some implementations, modulation strategy improvements can be provided (e.g., by updating the algorithms performed by modulator circuitry) for a DC to DC power stage that includes a dual-active bridge in an onboard charger of an electric vehicle so that switching losses are reduced. For example, the reduction can occur at light loads and/or at medium loads. In some implementations, a variable DC bus voltage regulation can be used to provide efficient operation during changes in battery voltage and current levels in charging and/or discharging mode. PWM signal modulation and/or DC bus voltage regulation can be designed to have universal applicability to multiple different onboard chargers (sometimes referred to as different main power boards). For example, a vehicle manufacturer may design different main power boards for use in vehicles intended for separate geographic markets, such as the United States and Europe. As another example, the modulation and/or regulation can be universal to battery packs of different size. As another example, the modulation and/or regulation can be universally applicable to a charging mode and a discharging mode.

Examples herein refer to a dual-active bridge. As used herein, a dual-active bridge is an electric circuit that includes switches arranged in multiple legs on respective sides of a transformer.

Examples herein refer to a switch. As used herein, a switch is an electrical component that can connect or disconnect two or more conducting paths in an electrical circuit. For example, the switch can interrupt the current or allow the current to flow, based on the setting of the switch. In some implementations, a switch can include one or more semiconductor devices. For example, a switch can include a transistor. In some implementations, a switch includes a metal-oxide-semiconductor field-effect transistor (MOS-FET). For example, a switch can include a silicon-carbide MOSFET. As another example, a switch can include a silicon MOSFET. In some implementations, a switch includes an insulated-gate bipolar transistor (IGBT). Other switches can be used.

Examples herein mention circuitry. As used herein, circuitry is an electric circuit configured to perform one or more operations. In some implementations, circuitry can include a logic circuit of multiple devices. Such devices can include, but are not limited to logic gates (e.g., gates that implement one or more of logical NOT, AND, OR, NOT-AND (NAND), NOT-OR (NOR), or exclusive-OR (XOR) operations), and/or flip-flops. In some implementations, circuitry can include a discrete circuit. In some implementations, circuitry can include an integrated circuit. For example, circuitry can include a field-programmable gate array (FPGA). A circuit can include a processor (e.g., a general-purpose processor or a special-purpose processor) that is configured for reading and executing instructions stored in software. As used herein, software includes, but is not limited to, firmware.

Examples herein mention power conversion for a light load. As used herein, a light load is any operation corresponding to the operation of Level 1 charging equipment. For example, the power conversion for the light load can be performed at a voltage of about 110 volt (V). The power conversion for the light load can be defined to be at about 0-7 kilowatts (kW) of power. Examples of light load use cases include, but are not limited to, Level 1 110V AC charging, and 110V V2L discharging.

Examples herein mention power conversion for a medium load. As used herein, a medium load is any operation corresponding to the operation of Level 2 charging equipment. For example, the power conversion for the medium load can be performed between about 40 ampere (A) and about 80 A of AC. As another example, the power conversion for the medium load can be defined to be at about 7-14 kW. Examples of medium load use cases include, but are not limited to, Level 2 208V/240V 40A AC charging, and 240V V2V discharging.

Examples herein mention power conversion for a high load. As used herein, a high load is any operation corresponding to the operation of Level 3 charging equipment. For example, the power conversion for the high load can be defined to be at about 14-20 kW. Examples of high load use cases include, but are not limited to, Level 2 208V/240V 80A AC charging, 240V V2H discharging, and 240V vehicle-to-grid (V2G) discharging.

Examples herein refer to an electric vehicle. An electric vehicle is a machine that transports passengers or cargo, or both using at least one motor that is powered by electricity. The electric vehicle can include one electric motor or multiple motors, and the multiple motors include at least one electric motor. An electric motor can be powered by electricity in any of multiple ways, including, but not limited to, as an induction motor, a permanent magnet motor, an axial flux motor, or a reluctance motor. Examples of vehicles include, but are not limited to, cars, trucks, and buses. The number of wheels can differ between types of vehicles, and one or more (e.g., all) of the wheels can be used for propulsion of the vehicle.

FIG. 1 shows an example of an onboard charger (OBC) 100. The OBC 100 can be used with one or more other examples described elsewhere herein. Here, the OBC 100 is coupled to a grid 102. The grid 102 can be any kind of electrical grid that supplies power, including any of multiple types of networks for delivering electricity from a producer to one or more consumers. The grid 102 can be owned and/or operated by any of multiple types of actors, including, but not limited to, a public entity (e.g., a municipality, city, state, or country) that may act through one or more utility companies, or a private entity (e.g., a corporation, another private enterprise, or an individual). The grid 102 can deliver electricity to a building at any of multiple levels of power.

Here, the OBC 100 is coupled to a battery 104 of the vehicle where the OBC 100 is implemented. Other components of the vehicle are not shown for simplicity. The battery 104 includes an assembly of one or more electrochemical cells configured to power an electric motor of the vehicle for propulsion. Electrochemical cells can include an electrolyte and electrodes to store energy and deliver the energy when used. Electrochemical cells have any of various chemistries. Electrochemical cells can have any of multiple different form factors.

The OBC 100 includes power factor correction circuitry 106. The power factor correction circuitry 106 can include a rectifier and optionally one or more filters to convert AC power (e.g., from the grid 102) into power for a DC bus in the vehicle. In a charging mode, the power factor correction circuitry 106 can control (e.g., dynamically regulate) a DC bus voltage.

The OBC 100 includes a DC link capacitor 108. The DC link capacitor 108 can have a DC bus voltage when the OBC 100 is operating. The OBC 100 can have respective positive and negative DC terminals between which the DC link capacitor 108 is electrically connected.

The OBC 100 includes a DC to DC stage 110. The DC to DC stage 110 includes a dual-active bridge (DAB) and is isolated, as schematically indicated using a dashed outline, can be galvanically isolated, meaning that the input side and the output side of the DC to DC stage 110 do not share a common ground, and that the DC to DC stage 110 has a transformer that eliminates any DC path between the input side and the output side. For example, the DC to DC stage 110 can generate DC output that is provided to the battery

104. As another example, the DC to DC stage 110 can receive DC from the battery 104 and provide a DC output in the opposite direction.

The OBC 100 is responsible for charging the battery 104 from the grid 102 (sometimes referred to as a grid-to-vehicle, or G2V, operation) or from another power source. The OBC 100 can also transfer power from the battery 104 to a load connected by a consumer (e.g., in a V2L operation); transfer power to the grid 102 (e.g., a V2G operation); or transfer power to another vehicle (e.g., a V2V operation). AC charging sources can have widely varying current ratings (including, but not limited to, between about 12 A and about 80 A). Consumer loads can vary widely (including, but not limited to, between about 45 W and about 5 KW). Voltages of the battery 104 of the vehicle 200 can vary widely (including, but not limited to, between about 250 V and about 925 V). Designing a power converter such as the OBC 100 can then be challenging, for example due to the following.

As mentioned, the OBC 100 has, in a left-to-right direction, the power factor correction circuitry 106 followed by the DC to DC stage 110. When operated with a light load, OBCs having such an architecture can have a relatively poor efficiency due to a loss of soft switching at the DC to DC stage 110. This lack of soft switching increases switching losses and results in poor system efficiency. In other situations, an OBC may operate at or near full load, which can be associated with other disadvantages or limitations. For example, the full-load efficiency of an OBC may be optimized for a specific battery voltage; when the battery voltage varies from the specified level (during charging or discharging) the efficiency can be degraded. As illustrated by examples herein relating to the first concept of the present subject matter, a light-load efficiency can be improved by a dynamic modulation scheme for the DAB by guaranteeing soft switching of the DC to DC stage 110. The dynamic modulation can extend the ZVS range of the DAB. For example, ZVS at light and/or medium loads can sometimes be ensured. Also or instead, as illustrated by examples herein relating to the second concept of the present subject matter, a high or even optimal full-load efficiency can be ensured at least in part by a dynamic regulation of the DC bus voltage. The dynamic modulation of phase shifts can be performed to extend a ZVS region from a light load to high load operations. However, the dynamic modulation may not be able to cover an entire range due to the deadband effect. The dynamic DC bus voltage regulation can ensure that an entire power range achieves ZVS. Dynamically regulating the DC bus voltage can be performed so that soft switching is ensured throughout an entire range of voltages of the battery 104. For example, the dynamic regulation can avoid a deadband effect limit.

Figure 2:
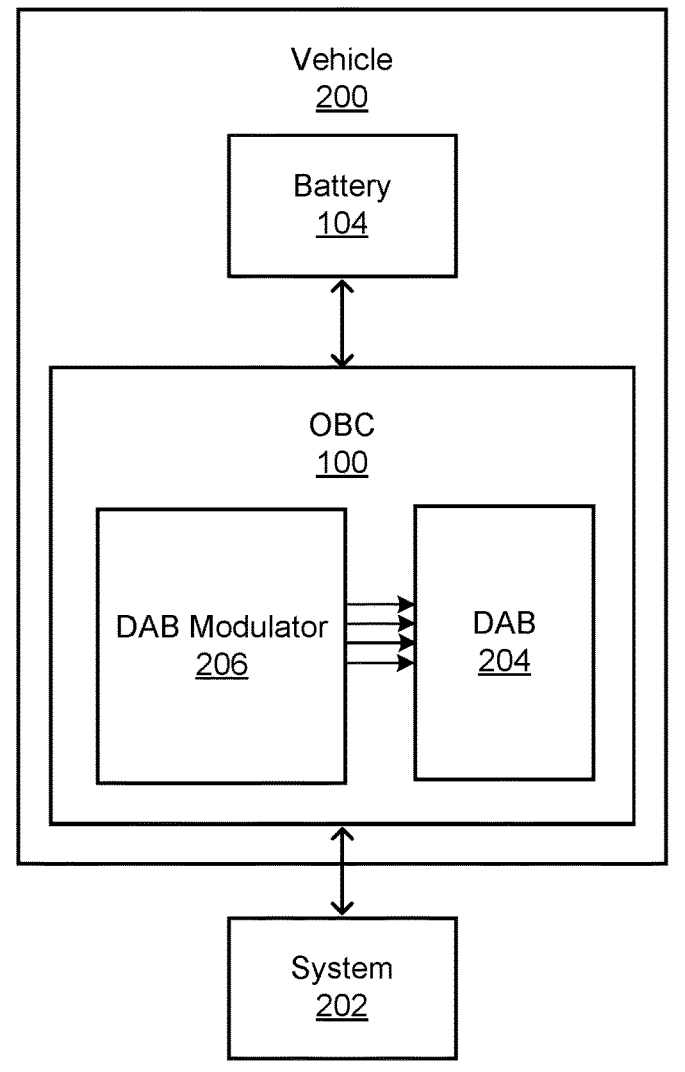
FIG. 2 shows an example of a vehicle including the OBC and battery of FIG. 1.

FIG. 2 shows an example of a vehicle 200 including the OBC 100 and the battery 104 of FIG. 1. The vehicle 200 can be used with one or more other examples described elsewhere herein. The vehicle 200 is here shown to be electrically connected so that the OBC 100 can be coupled to and interact with a system 202 in either direction, the system 202 being separate from the vehicle 200, examples of which are described below.

The OBC 100 includes a DAB 204 and modulator circuitry 206 for the DAB 204. That is, the DAB 204 can be part of a DC to DC stage of the OBC 100 and can operate to provide power transformation in one or both directions between the battery 104 and the system 202. The modulator circuitry 206 provides dynamic modulation of the PWM signals for the DAB 204. For example, the phase shifts of the PWM signals can be dynamically modulated to improve efficiency. The modulator circuitry 206 can include a processor executing instructions stored in software, or can include a logic circuit (e.g., an FPGA), to name just two examples.

The OBC 100 can perform power transfer operations in any of multiple modes. In some implementations, the OBC 100 can convert AC to DC for charging the battery 104 onboard the vehicle 200. The system 202 can then include an electrical outlet of the grid 102, or another power source (e.g., a standalone stationary storage system for electric energy).

In some implementations, the OBC 100 can convert DC to AC. For example, the OBC 100 can perform a discharging operation, such as a V2L operation. The system 202 is then an electrical device serving as a load that receives energy from the battery 104. As another example, the OBC 100 can perform another discharging operation, such as a V2H operation. The system 202 is then an electrical system of a residence or other building that is to be powered from the battery 104. As another example, the OBC 100 can perform another discharging operation, such as a V2V operation. The system 202 is then an electric vehicle receiving power from the battery 104. In a discharging mode (including, but not limited to, during V2L, V2H, or V2V operation) the DAB 204 can control (e.g., dynamically regulate) a DC bus voltage. Other power transfer operations can be performed in either direction between the battery 104 and the system 202.

The above examples illustrate that a method can include: providing, in an OBC (e.g., the OBC 100) of an electric vehicle (e.g., the vehicle 200), a DC to DC stage (e.g., the DC to DC stage 110) including a DAB (e.g., the DAB 204) having switches arranged in multiple legs, each of the multiple legs controlled by a corresponding one of PWM signals; and dynamically modulating (e.g., by the modulator circuitry 206) the PWM signals to improve ZVS in the onboard charger.

The above examples also illustrate that an OBC (e.g., the OBC 100) can include: a DC to DC stage (e.g., the DC to DC stage 110), the DC to DC stage including a DAB (e.g., the DAB 204) having switches arranged in multiple legs, each of the multiple legs controlled by a corresponding one of PWM signals, and modulator circuitry (e.g., the modulator circuitry 206) for the DAB, the modulator circuitry configured to dynamically modulate the PWM signals to improve ZVS in the onboard charger.

Figure 3:
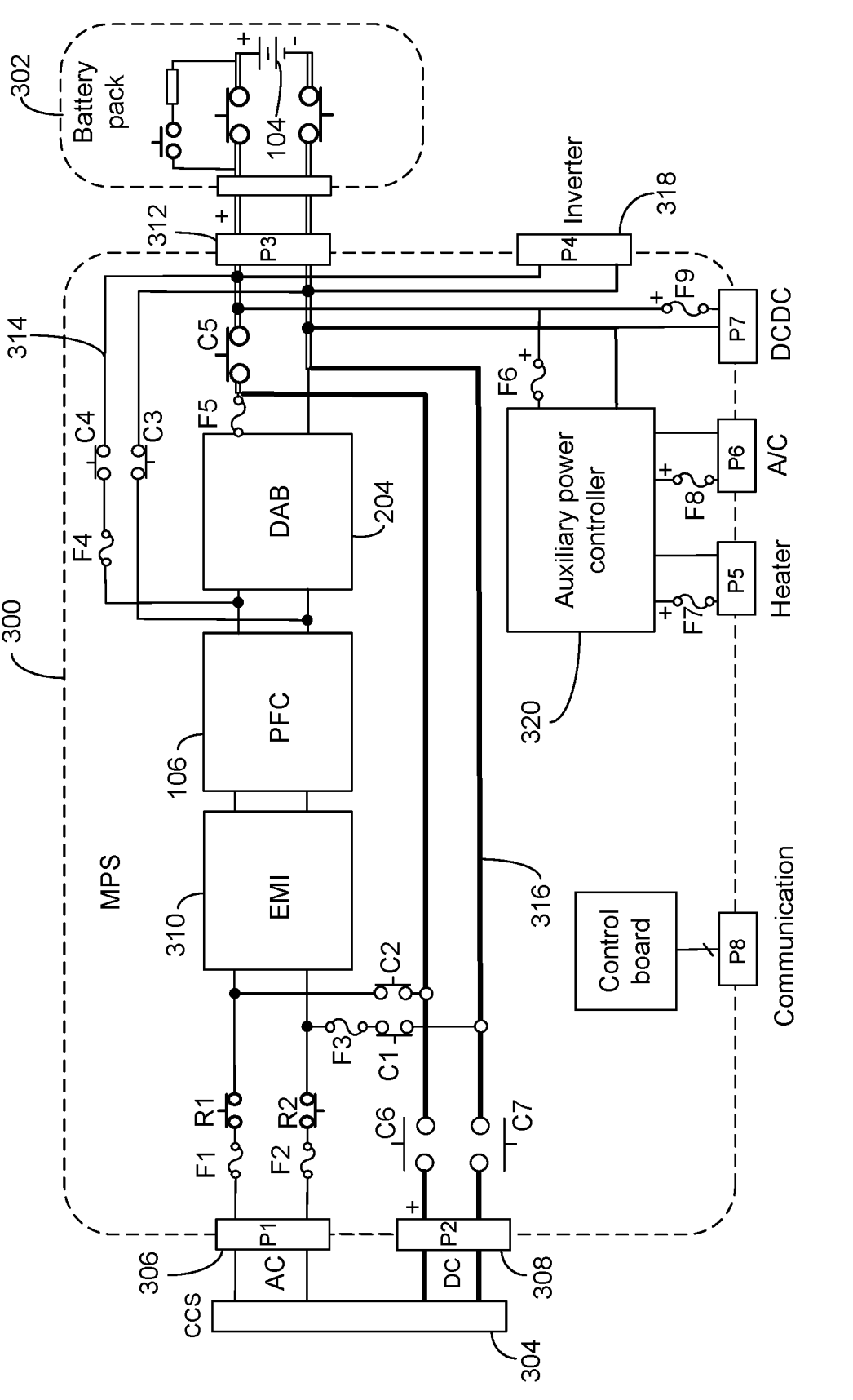
FIG. 3 shows an example of a main power board that can be used with the OBC of FIG. 1.

FIG. 3 shows an example of a main power stage 300 that can be used with the OBC 100 of FIG. 1. For example, one or more components of the OBC 100 can be included in the main power stage 300. The main power stage 300 can be implemented in a vehicle to provide power conversion in either direction. Here, the main power stage 300 is connected with a battery pack 302 of the vehicle. For example, the battery pack 302 can include the battery 104. The main power stage 300 can also or instead be used with one or more other examples described elsewhere herein.

The main power stage 300 is connected to a port 304 for one or more types of connectors. Such connector(s) can be compatible with and operate according to one or more published standards for charging equipment and/or charging protocols. Here, the port 304 is labeled CCS for the Combined Charging System standard. In other implementations, another charging standard can be used instead or additionally. The port 304 can provide one or more receptacles for a charging connector. A port 306 of the main power stage 300 can be designated for AC power transfer. A port 308 can be designated for DC power transfer.

The main power stage 300 includes an electromagnetic interference (EMI) filter 310. The EMI filter 310 can suppress electromagnetic noise when the main power stage 300 transfers power in either direction. For example, the EMI filter 310 can include a low-pass filter. The EMI filter 310 can be connected directly or indirectly to the port 306 and/or 308. One or more fuses and/or one or more switches (e.g., a pushbutton) can be connected between the EMI filter 310 and the port 306 and/or 308.

The main power stage 300 here includes the power factor correction circuitry 106. The power factor correction circuitry 106 can be connected to the EMI filter 310 on an opposite side from the port 306 and/or 308. In a charging mode of the main power stage 300, the power factor correction circuitry 106 can dynamically regulate a DC bus voltage, for example as described below.

The main power stage 300 includes the DAB 204. The DAB 204 can be connected to the power factor correction circuitry 106 on an opposite side from the EMI filter 310. In a discharging mode of the main power stage 300, the DAB 204 can dynamically regulate the DC bus voltage, for example as described below.

The main power stage 300 includes a port 312 for the battery 104. The DAB 204 can be connected directly or indirectly to the port 312. For example, one or more fuses and/or one or more switches (e.g., a pushbutton) can be connected between the DAB 204 and the battery 104.

The main power stage 300 includes a DAB bypass 314, here including two conductors. In some implementations, the DAB bypass 314 forms a connection directly or indirectly between the power factor correction circuitry 106 and the port 312. For example, the DAB bypass 314 can include one or more fuses and/or one or more switches (e.g., a pushbutton).

The main power stage 300 includes a DC path 316, here including two conductors, that bypasses the EMI filter 310, the power factor correction circuitry 106, and the DAB 204. The DC path 316 can directly or indirectly connect the port 308 and the port 312 with each other. For example, the DC path 316 can include one or more switches (e.g., a pushbutton). The DC path 316 can be directly or indirectly connected with the EMI filter 310, such as via one or more fuses and/or one or more switches (e.g., a pushbutton).

The main power stage 300 includes a port 318 for electric connection of an inverter as part of power electronics in the vehicle. The port 318 can directly or indirectly connect the port 312 (and thereby the battery 104) and the inverter with each other. For example, DC power from the battery 104 can be provided to the inverter using the ports 312 and 318 and can there be converted to AC for powering an electric traction motor of the vehicle.

The main power stage 300 includes an auxiliary power controller 320. The auxiliary power controller 320 can provide power from the main power stage 300 (e.g., received from the battery 104 and/or from the port 304) to one or more components of the vehicle. Such components can include, but are not limited to, a heater or air conditioning equipment.

Figure 4:
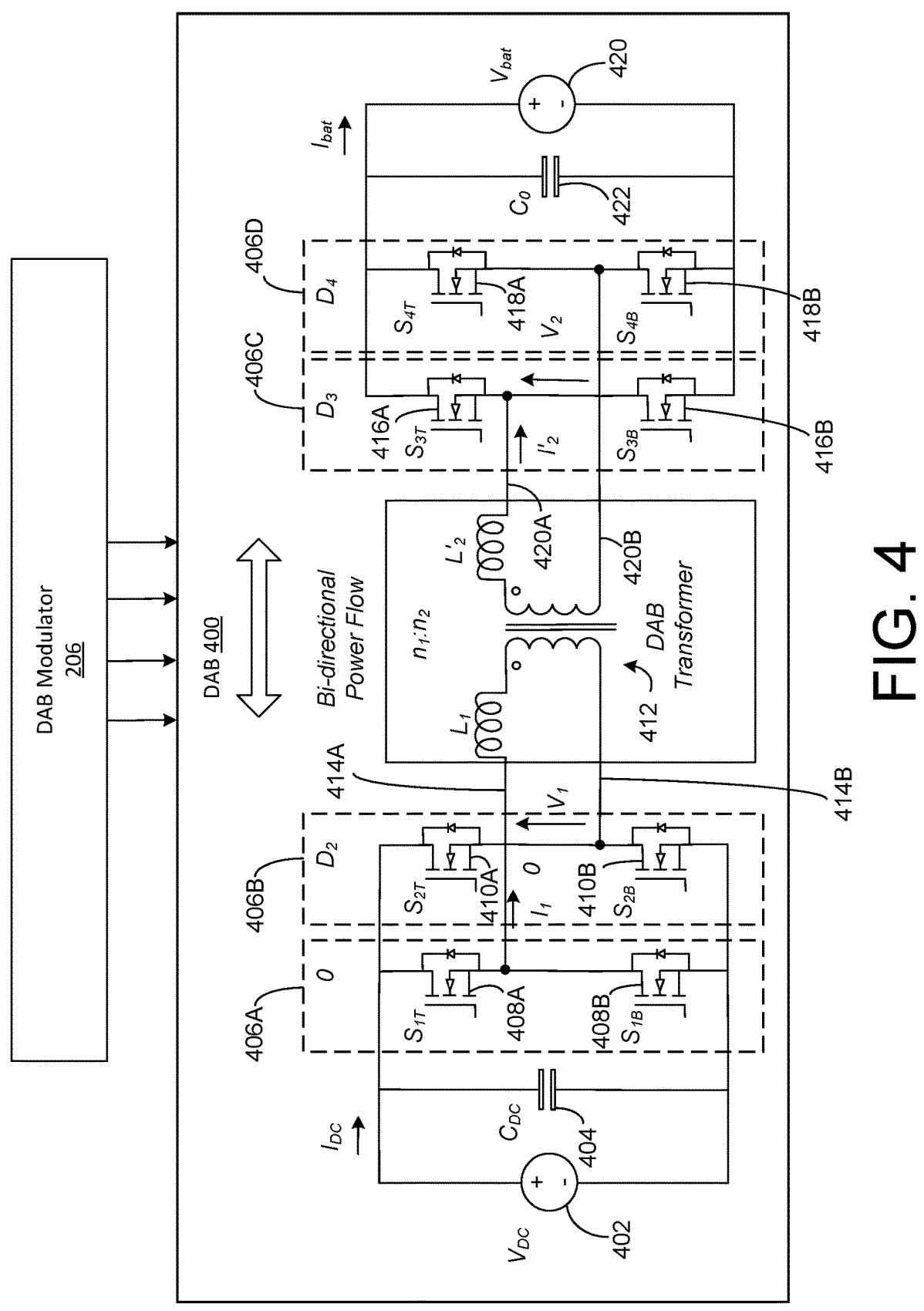
FIG. 4 shows an example of a dual-active bridge (DAB) that can be used with the OBC of FIG. 1.
Figure 5:
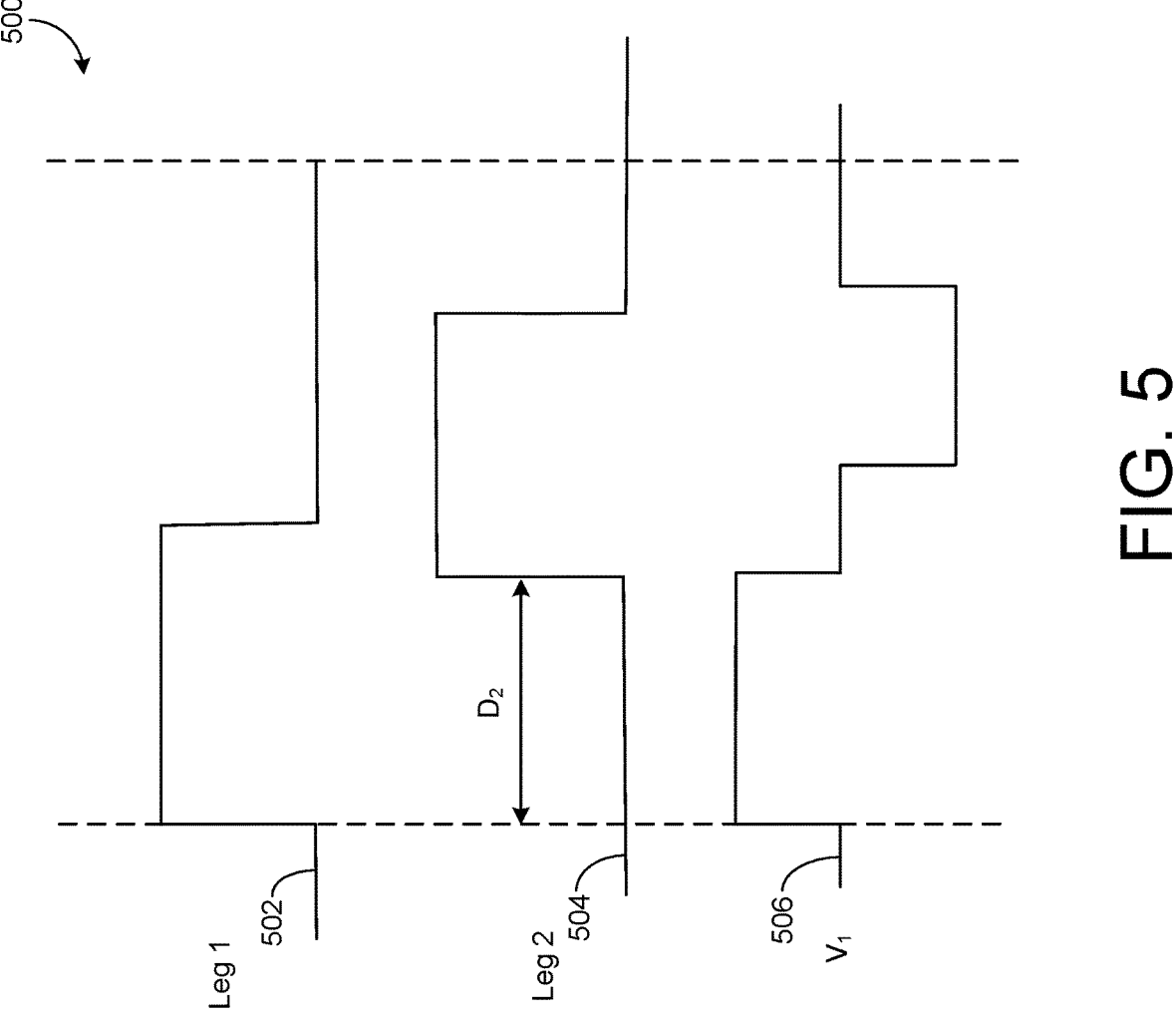
FIG. 5 shows an example of pulse width modulation (PWM) signals for the DAB of FIG. 4.
Figure 6:
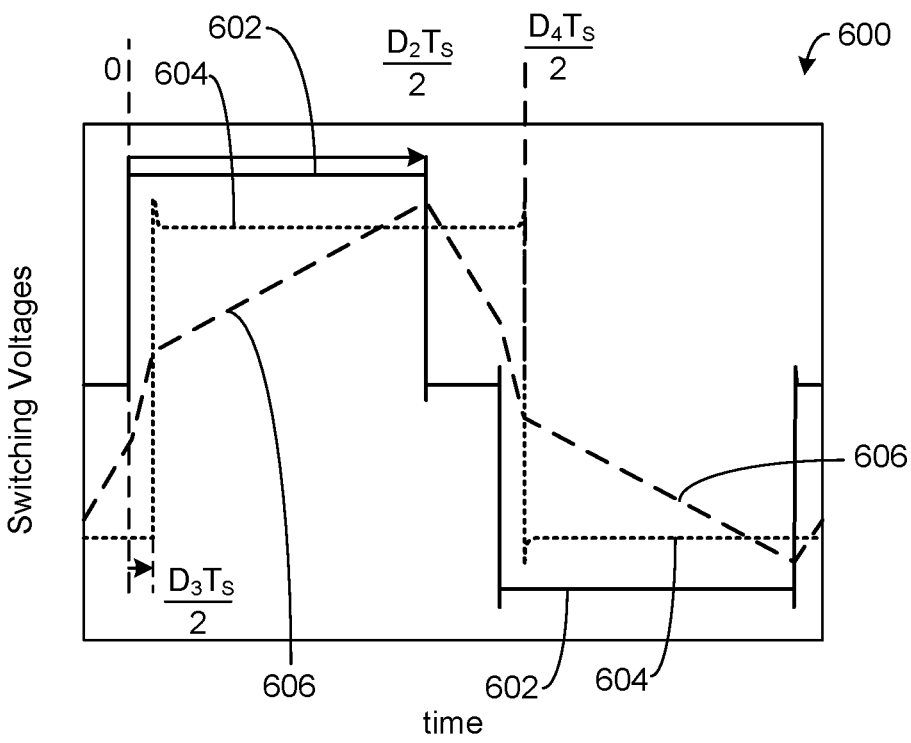
FIG. 6 shows an example of a graph of primary voltage, secondary voltage, and transformer current for a DAB converter.

FIG. 4 shows an example of a DAB 400 that can be used with the OBC of FIG. 1. FIG. 5 shows an example of pulse width modulation (PWM) signals 500 for the DAB 400 of FIG. 4. FIG. 6 shows an example of a graph 600 of primary voltage 602, secondary voltage 604, and transformer current 606 for a DAB converter. The DAB 400, the PWM signals 500, and/or the graph 600 can be used with one or more other examples described elsewhere herein.

The DAB 400 is connected to a DC power source 402, here labeled $V_{DC}$. The DAB 400 has a DC link capacitor 404, here labeled $C_{DC}$, connected to the terminals of the DC power source 402. The DC link capacitor 404 has a DC bus voltage.

The DAB 400 includes switches arranged in legs 406A-406D, respectively. The leg 406A is here associated with a phase shift parameter 0 (e.g., a baseline), is connected to the terminals of the DC power source 402, and includes switches 408A-408B, respectively. The leg 406B is here associated with a phase shift parameter $D_2$, is connected to the terminals of the leg 406A, and includes switches 410A-410B, respectively. The DAB 400 includes a transformer 412 having a terminal 414A connected between the switches 408A-408B, and a terminal 414B connected between the switches 410A-410B. A voltage $V_1$ between the terminals 414A-414B can be referred to as a primary voltage of the transformer 412. The leg 406C is here associated with a phase shift parameter $D_3$, is connected to the terminals of the transformer 412, and includes switches 416A-416B, respectively. The leg 406D is here associated with a phase shift parameter $D_4$, is connected to the terminals of the leg 406C, and includes switches 418A-418B, respectively. The switches 408A-408B, 410A-410B, 416A-416B, and 418A-418B are here shown as N-channel MOSFETs for illustrative purposes only. Other types of switches can be used, including, but not limited to, a P-channel MOSFET or a non-MOSFET, such as a FET or a bipolar junction transistor. The transformer 412 has a terminal 420A connected between the switches 416A-416B, and a terminal 420B connected between the switches 418A-418B. A voltage $V_2$ between the terminals 420A-420B can be referred to as a secondary voltage of the transformer 412.

The DAB 400 has the leg 406D coupled across the terminals of a battery 420, here labeled $V_{bat}$. A capacitor 422, here labeled Co, is also connected across the terminals of the battery 420.

The DAB 400 is an isolated DC-DC topology. The DAB 400 can provide bi-directional power flow due to its topological symmetry. The power flow can be controlled by varying the phase shift between the primary and secondary voltages, for example as described below. Any of multiple control techniques can be used. One example is single-phase shift modulation, where the only phase difference is between the primary and secondary bridge voltages. The voltages can be square or quasi-square shaped. As such, PWM signals such as the PWM signals 500 can be dynamically modulated by changing one or more phase shifts among the PWM signals.

In the PWM signals 500, a PWM signal 502 is for the leg 406A, and a PWM signal 504 is for the leg 406B. Each of the PWM signals 502-504 is illustrated as a signal (e.g., a waveform) shown in relation to a coordinate system. Time is indicated with reference to the horizontal axis. Voltage of the PWM signal is indicated with reference to the vertical axis. The PWM signals 502-504 are phase shifted by a phase shift based on a parameter $D_2$. A voltage 506 is equal to the PWM signal 502 minus the PWM signal 504 and corresponds to the voltage V1 between the terminals 414A-414B (e.g., the primary voltage). The phase shift parameters $D_2$, $D_3$, and $D_4$ will determine when the edges of the voltages happen in the DAB 400. Similarly, a corresponding PWM scheme can be applied for the secondary voltage.

In the graph 600, the legs 406B-406D are associated with the following phase shifts with regard to the leg 406A:

$$\frac{D_2 T_s}{2} = \text{Phase shift of the leg } 406B,$$

$$\frac{D_3 T_s}{2} = \text{Phase shift of the leg } 406C, \text{ and}$$

$$\frac{D_4 T_s}{2} = \text{Phase shift of the leg } 406D,$$

wherein $T_s$ is the period of the PWM signals, reciprocal to a switching frequency $f_{sw}$, and which can be held constant (e.g., not to exceed a fixed frequency for EMI reasons). That is, the phase shift parameter $D_2$ here corresponds to a falling edge of the primary voltage 602.

In the single-phase shift modulation, the inner phase shifts can be one. That is, if the phase shift parameter $D_2$ is one, the voltage V1 becomes square shaped (with a 50% duty cycle). Similarly, if the phase shift parameter $D_4$ minus the phase shift parameter $D_3$ is equal to one, the voltage V2 becomes square shaped (with a 50% duty cycle). An inter-bridge phase shift corresponding to the phase shift parameter $D_3$ can be variable.

In the following, it is assumed that a transformer ratio is 1:1. The power transfer of the DAB 400 when using single-phase shift modulation can be expressed as:

$$P_{out} = \frac{V_1 V_2}{2L f_{sw}} D_3 (1 - D_3),$$

where L is the inductance of the DAB. The magnitude and direction of the power transfer can be controlled by the selection of the phase shift parameter $D_3$.

Other types of modulation can be performed. In some implementations, dual-phase shift modulation (e.g., two degrees of freedom among the phase shift parameters $D_2$, $D_3$, and $D_4$) can be used. In some implementations, triple-phase shift modulation (e.g., three degrees of freedom among the phase shift parameters $D_2$, $D_3$, and $D_4$) can be used. In the triple-phase shift modulation, the inner phase shifts can be less than one (<1). That is, if the phase shift parameter $D_2$ is less than one, the voltage V1 becomes quasi-square shaped. Similarly, if the phase shift parameter $D_4$ minus the phase shift parameter $D_3$ is less than one, the voltage V2 becomes quasi-square shaped (with a 50% duty cycle). That is, three variables can be actively controlled to shape the inductor current in order to reduce losses.

The following are ZVS criteria relevant to triple-phase shift modulation:

Leg 406A: $i_L(t = 0) = -I_1$; $|I_1| > I_{1,crit,A}$ neg. inductor current,

Leg 406B: $i_L\left(t = \frac{D_2 T_s}{2}\right) =$ $I_2 > I_{2,crit,A}$ pos. inductor current (always true), Leg 406C: $i_L\left(t = \frac{-D_3 T_s}{2}\right) = I_3 > I_{3,crit,A}$ pos. inductor current, and Leg 406D: $i_L\left(t = \frac{D_4 T_s}{2}\right) = -I_3$; $|I_3| > I_{3,crit,A}$ neg. inductor current, where $I_{1,crit,A}$ is a critical value of the current $I_1$, for state A.

Figure 7:
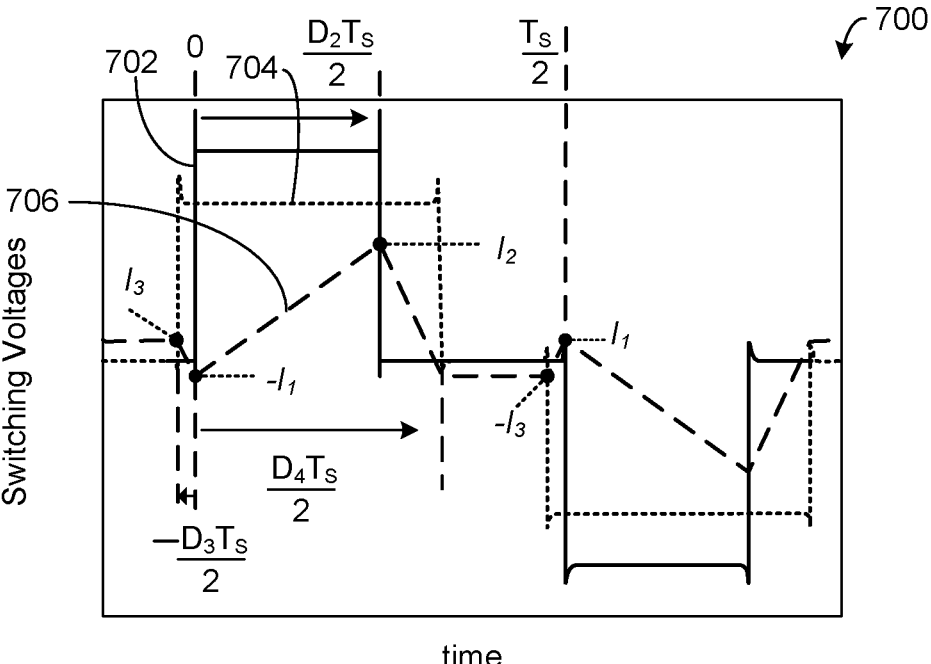
FIG. 7 shows another example of a graph of primary voltage, secondary voltage, and transformer current for a DAB converter during a state characterized as a buck light load.
Figure 8:
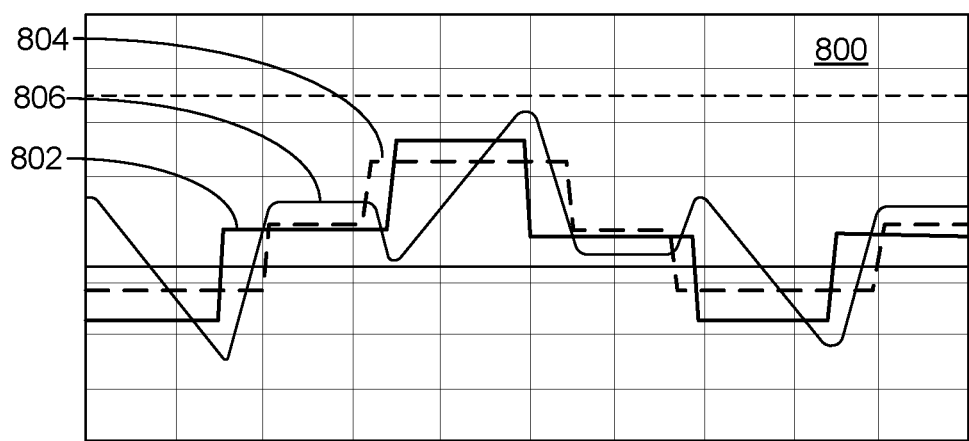
FIG. 8 shows an example of a graph with experimental results for the state of FIG. 7.

FIG. 7 shows another example of a graph 700 of primary voltage 702, secondary voltage 704, and transformer current 706 for a DAB converter during a state characterized as a buck light load. FIG. 8 shows an example of a graph 800 with experimental results for the state of FIG. 7. The graph 700 and/or 800 can be used with one or more other examples described elsewhere herein.

The present example, which involves a buck charging mode with a light load, is described in the context of a triple-phase mode modulation. That is, dynamic modulation of PWM signals can be performed that corresponds to a buck mode operation at a light load. As such, all switches can be made to operate with ZVS, and the relatively greatest switching loss can occur at the leg 406B. The modulation algorithm that provides the dynamic modulation of PWM signals can be based on the following phase shift parameters:

$$D_2 = PI_{out},$$

$$D_4 = \frac{2L f_{sw}}{V_2}(I_3 - I_1) + \frac{V_1}{V_2} D_2, \text{ and}$$

$$D_3 = -\frac{2L f_{sw}}{V_2}(I_1 + I_3),$$

where P is the power, $I_{out}$ is the output current, L is the inductance of the DAB, and where the currents $I_1$, $I_2$ and $I_3$ are indicated in the graph 700. As $PI_{out}$ increases, the phase shift parameters $D_2$ and $D_4$ also increase. The phase shift parameter $D_3$, on the other hand, can be maintained constant. For example, $D_3$ can be decided based on required values of the currents $I_1$ and $I_3$ to provide a ZVS turn-on of the primary and secondary bridges of the DAB.

During the buck light load state of the current example, the delivered output power can be expressed as follows:

$$I_2 = -I_1 + \frac{D_2 T_s}{2L}(V_1 - V_2), \text{ and}$$

$$P_o = V_1\left[\frac{1}{2}(I_2 - I_1)D_2\right] = V_1 D_2\left[-I_1 + \frac{D_2 T_s}{4L}(V_1 - V_2)\right] = f(I_1, D_2).$$

A boundary condition for the buck light load state can be expressed as follows:

$$|D_3| + D_4 = 1; \text{ or } D_2 = \frac{V_2}{V_1}\left[1 - \frac{4I_3 f_{sw} L}{V_2}\right] = D_{2,max},$$

which corresponds to the voltage $V_2$ having a square waveshape. The criteria for ZVS can be those mentioned above for triple-phase shift modulation. The maximum attainable power flow, moreover, can be expressed as:

$$P_{o,max} = P_o(I_1, D_{2,max}),$$

where $D_{2,max}$ is the corresponding $D_2$ value where the maximum power flow occurs in state A.

As a result of the dynamic modulation of the PWM signals, all legs of the DAB are soft-switched. The graph 800 shows a primary voltage 802, a secondary voltage 804, and a transformer current 806 relative to a horizontal axis representing zero. The graph 800 shows that the transformer current 806 is substantially negative when the primary voltage 802 begins rising above zero (e.g., this can correspond to leg 406A ZVS). The graph 800 also shows that the transformer current 806 is substantially positive when the primary voltage 802 begins falling below zero (e.g., this can correspond to leg 406B ZVS). The graph 800 also shows that the transformer current 806 is substantially positive when the secondary voltage 804 begins rising above zero (e.g., this can correspond to leg 406C ZVS). The graph 800 also shows that the transformer current 806 is substantially negative when the secondary voltage 804 begins falling below zero (e.g., this can correspond to leg 406D ZVS). As such, ZVS occurs at all legs of the DAB.

Figure 9:
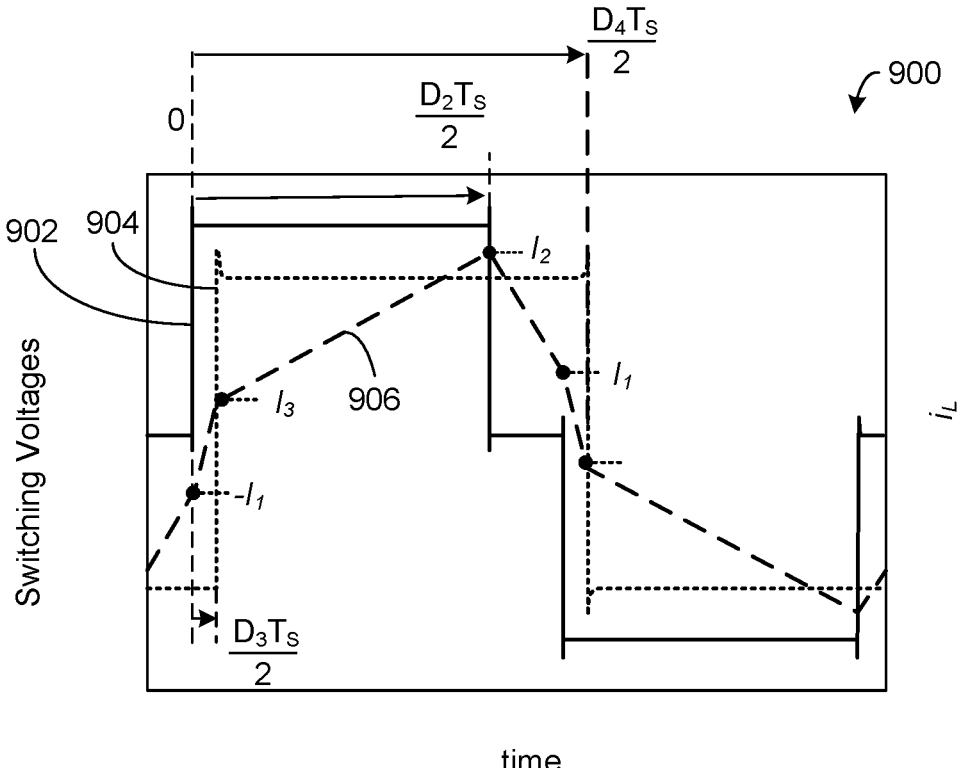
FIG. 9 shows another example of a graph of primary voltage, secondary voltage, and transformer current for a DAB converter during a state characterized as a buck medium load.

FIG. 9 shows another example of a graph 900 of primary voltage 902, secondary voltage 904, and transformer current 906 for a DAB converter during a state characterized as a buck medium load. The graph 900 can be used with one or more other examples described elsewhere herein.

A single PWM mode, or dual-phase shift modulation, can be used in the buck medium load of the current example, which can be referred to as a state C. All switches can perform ZVS based on the dynamic modulation. The modulator algorithm can be characterized as follows:

$$D_2 = PI_{out},$$

$$D_3 = \frac{2I_3 L f_{sw}}{V_1} + \frac{1}{2}\left(D_2 - \frac{V_2}{V_1}\right), \text{ and}$$

$$D_4 = 1 + D_3,$$

where $PI_{out}$ is a control output of a proportional integral (PI) controller, for example as described below with reference to FIG. 15; $I_3$ is indicated in the graph 900; and the modulation can provide a pure square wave at the secondary voltage 904 (V2). As $PI_{out}$ increases, $D_2$, $D_3$, and $D_4$ can increase, while a constant current $I_3$ can be maintained, depending on the ZVS turn-on current requirement for the leading secondary bridge leg, according to $I_3 \geq I_{3,crit,C}$.

During the buck medium load state, the delivered output power can be expressed as follows:

$$I_1 = I_3 \frac{V_2}{V_1} + \frac{D_2 T_s}{4L}(V_1 + V_2) - V_2\left(1 + \frac{V_2}{V_1}\right)\frac{T_s}{4L},$$

$$I_2 = I_3 \frac{V_2}{V_1} + \frac{T_s}{4L}(V_1 - V_2)\left(D_2 + \frac{V_2}{V_1}\right), \text{ and}$$

$$P_o = \frac{V_1}{2}[(I_3 - I_1)D_3 + (I_2 + I_3)(D_2 - D_3)] = f(I_3, D_2).$$

A ZVS boundary condition for the buck medium load can be expressed as follows:

$$I_3 = I_{3,crit,C} \text{ and } I_1 \geq I_{1,crit,C}, \text{ or}$$

$$D_2 \geq \frac{V_2}{V_1} + \left[I_{1,crit,C} - \frac{I_3 V_2}{V_1}\right] * \frac{4L f_{sw}}{V_1 + V_2} = D_{2,min},$$

where the lower power limit (minimum attainable power flow) can be expressed as $$P_{o,min,C} = P_o(I_3, D_{2,min}),$$

where the maximum attainable power flow can be expressed as $$P_{o,max,C} = P_o(I_3, D_{2,max} = 1).$$

ZVS criteria for the buck medium load state can be expressed as follows:

Leg 406A: $i_L(t = 0) = -I_1; |I_1| > I_{1,crit,A}$ neg. inductor current,

Leg 406B: $i_L\left(t = \frac{D_2 T_s}{2}\right) =$ $I_2 > I_{2,crit,A}$ pos. inductor current (always true), and Leg 406C/Leg 406D: $i_L\left(t = \frac{D_3 T_s}{2}\right) = I_3 > I_{3,crit,A}$ pos. inductor current.

Figure 10:
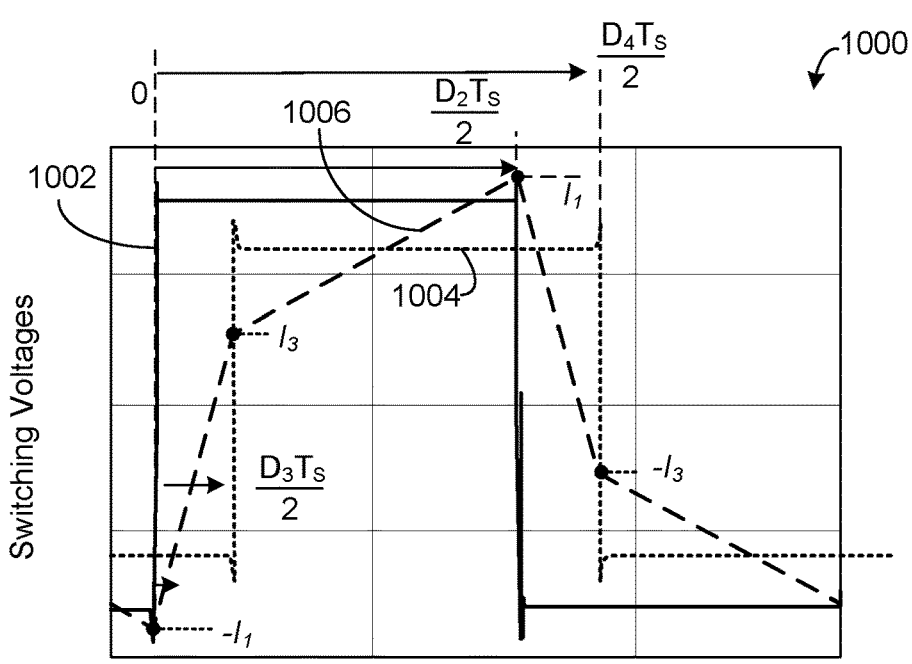
FIG. 10 shows another example of a graph of primary voltage, secondary voltage, and transformer current for a DAB converter during a state characterized as a buck high load.

FIG. 10 shows another example of a graph 1000 of primary voltage 1002, secondary voltage 1004, and transformer current 1006 for a DAB converter during a state characterized as a buck high load. The graph 1000 can be used with one or more other examples described elsewhere herein.

Single-phase shift modulation can be used in the buck high load of the current example, which can be referred to as a state D. All switches can perform ZVS based on the dynamic modulation. The modulator algorithm can be characterized as follows:

$$D_2 = 1,$$

$$D_3 = \frac{2I_3 L f_{sw}}{V_1} + \frac{1}{2}\left(1 - \frac{V_2}{V_1}\right), \text{ and}$$

$$D_4 = 1 + D_3,$$

where $I_3$ is indicated in the graph 1000, and the modulation can provide a pure square wave at the primary voltage 1002 (V1) and a pure square wave at the secondary voltage 1004 (V2).

During the buck high load state, the delivered output power can be expressed as follows:

$$P_o = \frac{V_1 V_2}{2L f_{sw}} D_3(1 - D_3) = f(D_3), \text{ and}$$

$$I_3 = \frac{V_1}{2L f_{sw}}\left[D_3 - \frac{1}{2}\left(1 - \frac{V_2}{V_1}\right)\right].$$

A ZVS boundary condition for the buck high load state can be expressed as follows:

$$I_3 \geq I_{3,crit,D} \text{ and } I_1 \geq I_{1,crit,D}, \text{ or}$$

$$D_3 \geq \frac{2I_{3,crit,D} L f_{sw}}{V_1} + \frac{1}{2}\left(1 - \frac{V_2}{V_1}\right) = D_{3,min},$$

where the lower power limit can be expressed as:

$$P_{o,min,D} = P_o(D_{3,min}) = P_{o,max,C} = P_o(I_3, D_{2,max} = 1).$$

ZVS criteria for the buck high load state can be expressed as follows:

Leg 406A/Leg 406B: $i_L(t = 0) = -I_1; |I_1| >$ $$I_{1,crit,A} \quad neg. \text{ inductor current (always true), and}$$

Figure 11:
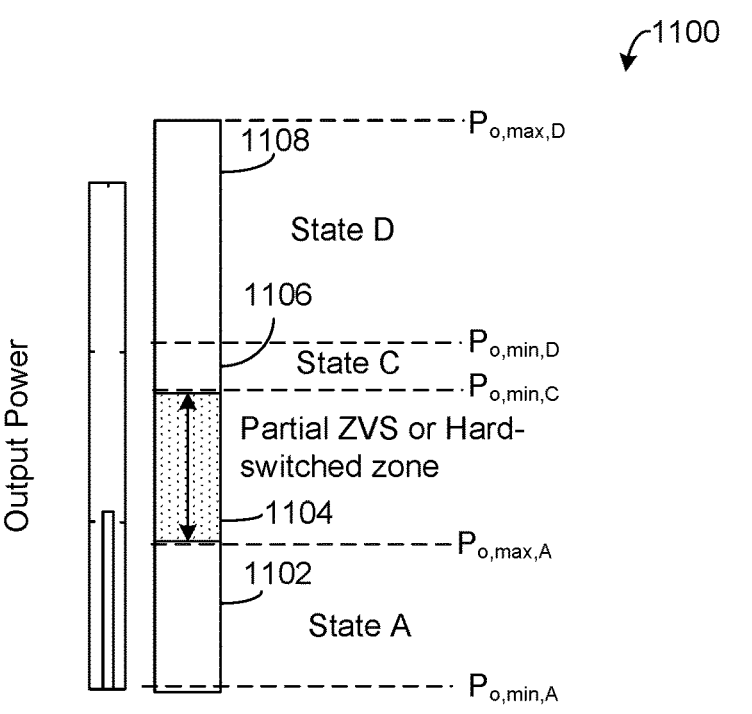
FIG. 11 shows an example of DAB modulation for a complete output power range at buck mode.

Leg 406C/Leg 406D: $i_L\left(t = \dfrac{D_3 T_s}{2}\right) = I_3 > I_{3,crit,D} \quad pos. \text{ inductor current.}$ FIG. 11 shows an example 1100 of DAB modulation for a complete output power range at buck mode. The example 1100 can be used with one or more other examples described elsewhere herein. The example 1100 shows output power against a vertical axis for states 1102-1108 of operation. The state 1102 can be referred to as state A (e.g., the buck light load operation of FIG. 7) and can be characterized by a lower output power limit $P_{o,min,A}$ and an upper output power limit $P_{o,max,A}$. The state 1104 can be referred to as a partial ZVS or hard-switched zone and can be characterized by a lower output power limit $P_{o,max,A}$ and an upper output power limit $P_{o,min,C}$. The state 1106 can be referred to as state C (e.g., the buck medium load operation of FIG. 9) and can be characterized by a lower output power limit $P_{o,min,C}$ and an upper output power limit $P_{o,min,D}$. The state 1108 can be referred to as state D (e.g., the buck high load operation of FIG. 10) and can be characterized by a lower output power limit $P_{o,min,D}$ and an upper output power limit $P_{o,max,D}$.

Figure 13:
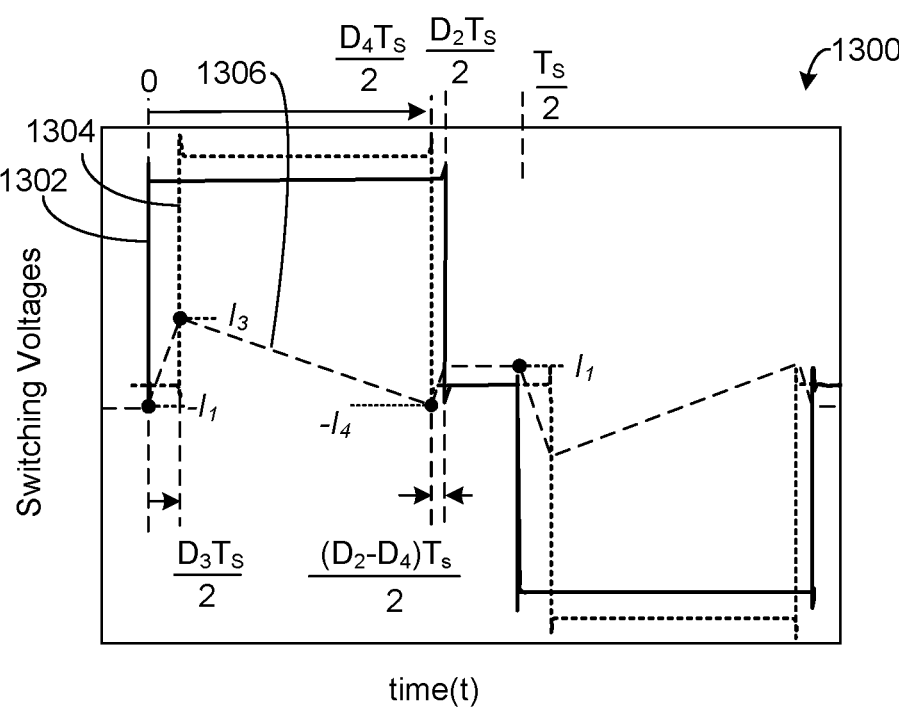
FIG. 13 shows an example of a graph of primary voltage, secondary voltage, and transformer current for a DAB converter during a state characterized as a boost light load.
Figure 14:
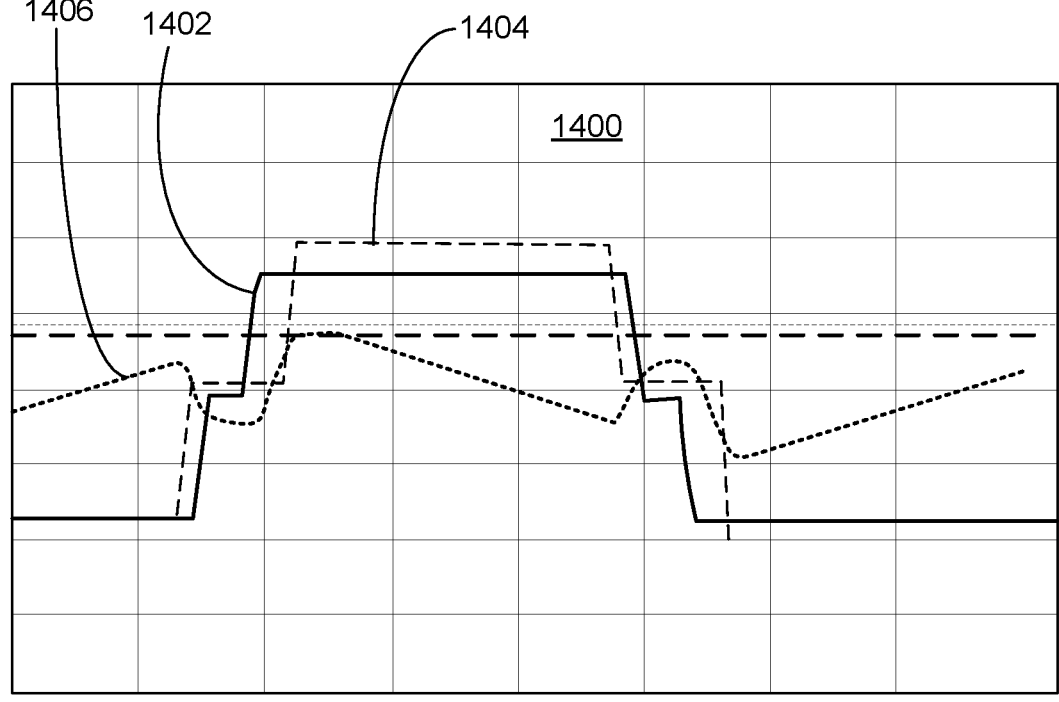
FIG. 14 shows an example of a graph with results for the state of FIG. 13.

FIG. 13 shows an example of a graph 1300 of primary voltage 1302, secondary voltage 1304, and transformer current 1306 for a DAB converter during a state characterized as a boost light load. FIG. 14 shows an example of a graph 1400 with results for the state of FIG. 13. The graph 1400 shows a primary voltage 1402, a secondary voltage 1404, and a transformer current 1406 relative to a horizontal axis representing zero. The graph 1300 and/or 1400 can be used with one or more other examples described elsewhere herein.

Triple-phase shift modulation can be used in the boost light load of the current example, which can be referred to as a state A. All switches can perform ZVS based on the dynamic modulation. The highest switching loss can occur at the leg 406C (FIG. 4). The modulator algorithm can be characterized as follows:

$$D_2 = PI_{out} + (I_1 + I_4)\frac{2Lf_{sw}}{V_1},$$

$$D_4 = PI_{out}, \text{ and}$$

$$D_3 = \left(1 - \frac{V_1}{V_2}\right)PI_{out} + \frac{2Lf_{sw}}{V_2}(I_1 - I_4).$$

The leg 406B can be delayed compared to the leg 406D to achieve ZVS. As $PI_{out}$ increases, $D_2$, $D_3$, and $D_4$ can increase, while a constant $D_4$–$D_2$ delay can be maintained. For example, this can depend on the required $I_1$ and $I_4$ for ZVS turn-on of the primary and secondary bridges.

During the boost light load state, the delivered output power can be expressed as follows:

$$I_3 = -I_4 + \frac{D_4 - D_3}{2Lf_{sw}}(V_2 - V_1), \text{ and}$$

-continued $$P_o = V_2\left[\frac{1}{2}(I_3 - I_4)(D_4 - D_3)\right] = f(I_4, I_1, PI_{out}).$$

A ZVS boundary condition for the boost light load state can be expressed as follows:

$$D_2 = 1 = PI_{out},$$

and the maximum attainable power flow can be expressed as:

$$P_{o,max,A} = P_o(I_1, I_4, PI_{out} = 1),$$

where a square waveshape is obtained at the primary bridge voltage $V_1$.

ZVS criteria for the boost light load state can be expressed as follows:

Leg 406A: $i_L(t = 0) = -I_1; |I_1| > I_{1,crit,A} \quad neg. \text{ inductor current,}$ Leg 406B: $i_L\left(t = \dfrac{D_2 T_s}{2}\right) = I_1 > I_{1,crit,A} \quad pos. \text{ inductor current,}$ Leg 406C: $i_L\left(t = \dfrac{D_3 T_s}{2}\right) =$ $$I_3 > I_{3,crit,A} \quad pos. \text{ inductor current (mostly true),}$$

and

Figure 12A:
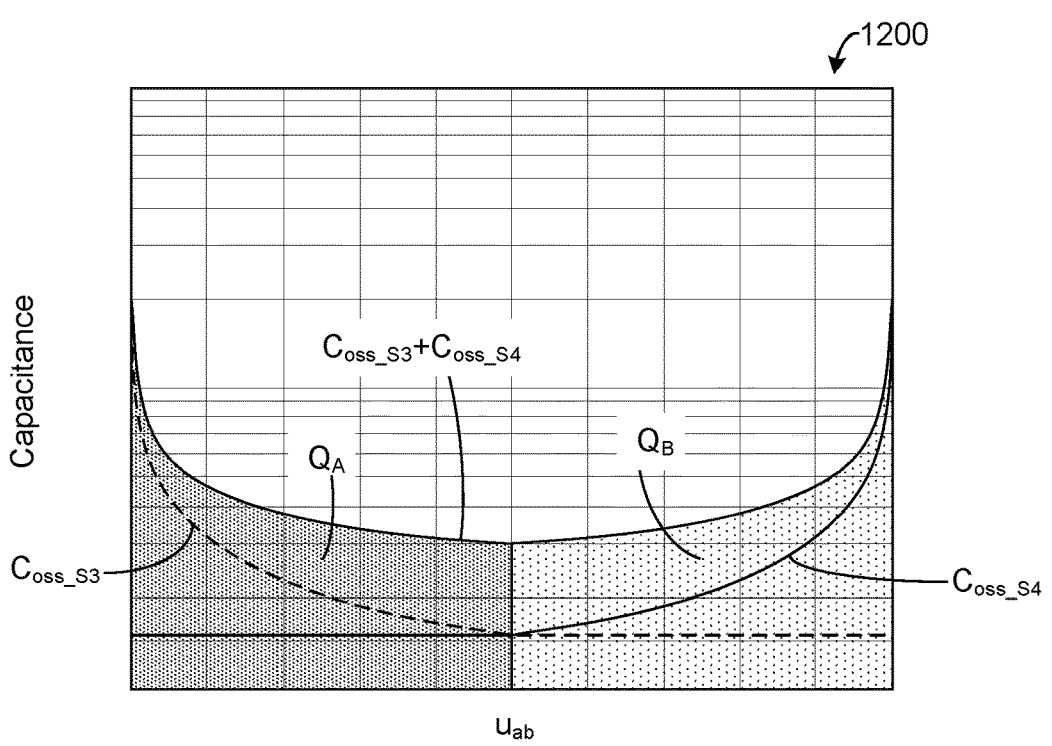
FIG. 12A shows a graph with examples of capacitance as a function of voltage.
Figure 12B:
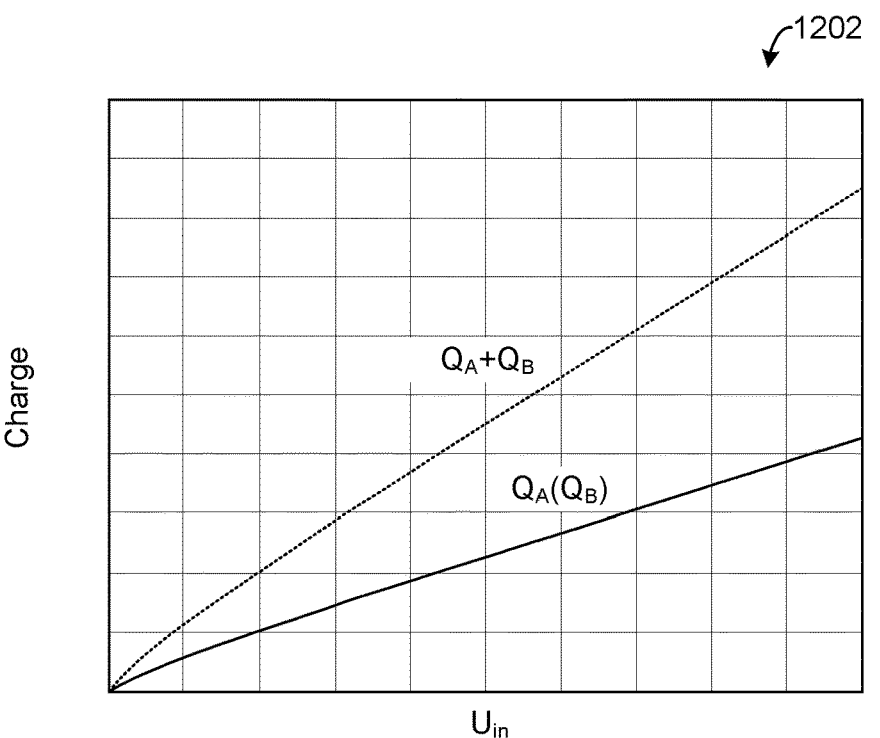
FIG. 12B shows a graph with examples of the charges as functions of voltage.

Leg 406C: $i_L\left(t = \dfrac{D_4 T_s}{2}\right) = -I_4; |I_4| > I_{4,crit,A} \quad neg. \text{ inductor current.}$ The required ZVS currents in a DAB can be calculated. FIG. 12A shows a graph 1200 with examples of capacitance as a function of voltage. A capacitance $C_{oss\_S3}$ has a high value at low voltages and decreases with increasing voltage. A capacitance $C_{oss\_S4}$ has a low value at low voltages and increases with increasing voltage. A sum of the capacitances $C_{oss\_S3}$ and $C_{oss\_S4}$ is also shown. An amount $Q_A$ of charge in the lower range of voltages, and an amount $Q_B$ of charge in the higher range of voltages, are indicated. FIG. 12B shows a graph 1202 with examples of the charges as functions of voltage. The graph 1202 shows the amounts $Q_A$ and $Q_B$ of charge, and a sum thereof.

In the buck state C operating mode of the DAB (e.g., the buck medium load of FIG. 9), a critical current $I_{1,crit,C}$ can be calculated using the mathematical expression $$\sqrt{2Q_{B(V_1)}\left(\frac{V_1 + V_2}{L}\right)},$$

and a critical current $I_{3,crit,C}$ can be calculated using the mathematical expression $$\sqrt{4Q_{A(V_2)}\left(\frac{V_1 + V_2}{L}\right)}.$$

In the buck state A operating mode of the DAB (e.g., the buck light load of FIG. 7), a critical current $I_{1,crit,A}$ can be calculated using the mathematical expression $$\sqrt{2Q_{B(V_1)}\left(\frac{V_2}{L}\right)},$$

and a critical current $I_{3,crit,A}$ can be calculated using the mathematical expression $$\sqrt{2Q_{B(V_2)}\left(\frac{V_2}{L}\right)},$$

Based on the above, dynamic modulation of PWM signals (e.g., delays added in a modulator) to achieve ZVS can be expressed as functions of DC link voltage and battery voltage. For example, a delay can be added to the leg 406C (FIG. 4) in the modulator for the state A buck mode as follows $$D_3 = -\frac{2Lf_{sw}}{V_2}(I_{1,crit,A} + I_{3,crit,A}).$$

In the boost state C operating mode of the DAB, a critical current $I_{1,crit,C}$ can be calculated using the mathematical expression $$\sqrt{2Q_{B(V_1)}\left(\frac{V_1 + V_2}{L}\right)},$$

and a critical current $I_{4,crit,C}$ can be calculated using the mathematical expression $$\sqrt{4Q_{A(V_2)}\left(\frac{V_1 + V_2}{L}\right)}.$$

In the boost state A operating mode of the DAB, a critical current $I_{1,crit,A}$ can be calculated using the mathematical expression $$\sqrt{2Q_{B(V_1)}\left(\frac{V_1}{L}\right)},$$

and a critical current $I_{4,crit,A}$ can be calculated using the mathematical expression $$\sqrt{2Q_{B(V_2)}\left(\frac{V_1}{L}\right)}.$$

Based on the above, dynamic modulation of PWM signals (e.g., delays added in a modulator) to achieve ZVS can be expressed as functions of DC link voltage and battery voltage. For example, a delay can be added to the leg 406B (FIG. 4) in the modulator for the state A boost mode as follows $$D_2 = PI_{out} + (I_{1,crit,A} + I_{4,crit,A})\frac{2Lf_{sw}}{V_1}.$$

Figure 15:
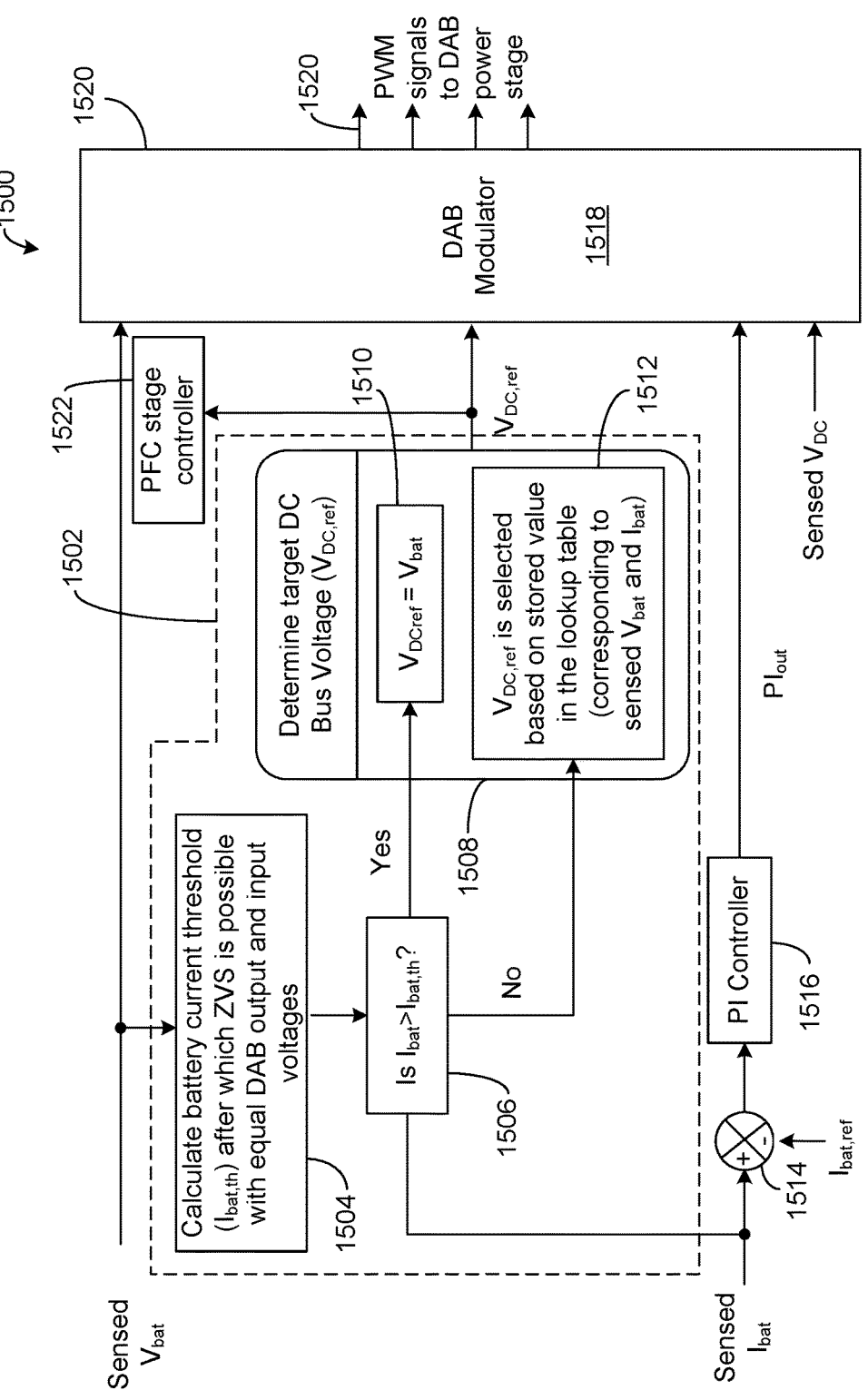
FIG. 15 shows an example of a flowchart illustrating a DAB control block that controls direct current (DC) bus voltage.

FIG. 15 shows an example of a flowchart 1500 illustrating a DAB control block 1502 that controls DC bus voltage. The DAB control block 1502 can be implemented using circuitry. FIG. 16 shows an example of a lookup table 1600 that can be used by the DAB control block of FIG. 15. The flowchart 1500 and/or the lookup table 1600 can be used with one or more other examples described elsewhere herein.

In some implementations, efficiency improvement can be accomplished using a dynamic DC bus for a DAB converter. For example, if the PWM signals for the DAB are dynamically modulated, regulating the DC bus voltage can further improve the efficiency. As such, the ideal choice of the DC bus voltage can be sought, such as for a light load operation (e.g., when $I_{out} < I_{o,th}$). The DAB control block 1502 can be implemented in the DC to DC stage 110 of FIG. 1, to name just one example.

The flowchart 1500 shows that a battery voltage ($V_{bat}$) and a battery current ($I_{bat}$) of the vehicle can be sensed. The DAB control block 1502 can then regulate the DC bus voltage to increase efficiency. In a block 1504, the DAB control block 1502 can calculate a battery current threshold ($I_{bat,th}$) for the battery. The battery current threshold should be such that ZVS is possible with equal DAB input and output voltages. The battery current threshold can be set based on an output power being greater than a boundary condition where a minimum transferred power is required to achieve a ZVS condition in a buck mode operation at a medium load. In a block 1506, the DAB control block 1502 can determine whether the battery current is greater than the battery current threshold (i.e., whether $I_{bat} > I_{bat,th}$). For example, a comparison of a sensed battery current with a battery current threshold can be performed, and the DC bus voltage can be selected based on the comparison. After the block 1506, the DAB control block 1502 can proceed to a block 1508. When the outcome of the block 1506 is positive (i.e., $I_{bat} > I_{bat,th}$), a block 1510 of the block 1508 can be processed. In the block 1510, the sensed battery voltage is assigned as the reference voltage for the DC bus voltage (i.e., $V_{DC,ref} = V_{bat}$). In contrast, when the outcome of the block 1506 is negative (i.e., $I_{bat} \leq I_{bat,th}$), a block 1512 of the block 1508 can be processed. In the block 1512, the reference voltage for the DC bus voltage can be obtained from a lookup table based on the sensed battery voltage and the sensed battery current.

The lookup table 1600 can be a multidimensional (e.g., two-dimensional or higher) table organized according to respective values of at least a battery voltage 1602 and a battery current 1604. For example, the battery voltage 1602 can be the sensed battery voltage, and the battery current 1604 can be the sensed battery current. In some implementations, the lookup table 1600 can also or instead be organized according to respective values of battery power. For example, the values of the battery current 1604 can be replaced by values of battery power. Multiple values can be included in the lookup table 1600. Here, the battery voltage 1602 includes values 1602-1, 1602-2, . . . , 1602-n, where n=1, 2, 3, . . . . Here, the battery current 1604 includes values 1604-1, 1604-2, . . . , 1604-m, where m=1, 2, 3, . . . . Values of the reference voltage for the DC bus voltage can be obtained from the lookup table 1600. For example, based on the value 1602-2 of the battery voltage 1602 and on the value 1604-2 of the battery current 1604, a value 1606 can be identified and assigned.

That is, for light load operations (e.g., when $I_{out}<I_{o,th}$ or $I_{bat}<I_{bat,th}$) a proper level for the DC bus voltage should be chosen. The selection of the threshold in the block 1504 can be performed so as to minimize switching loss at the DAB. The DC bus voltage can then be chosen based on the available battery voltage so that the DAB operates in ZVS. This may be a significant factor towards efficiency because at lighter load the switching loss is a major contributor to overall loss. Choosing the DC bus voltage lower than the battery voltage corresponds to a boost mode operation, with $P_o<P_{o,crit,A}$, and the DAB should operate with ZVS in the state A. On the other hand, choosing the DC bus voltage higher than the battery voltage corresponds to a buck mode operation, with $P_o<P_{o,crit,A}$, and the DAB should also operate with ZVS in the state A. However, turn-off switching losses may be greater in the latter option than in the former, due to the higher DC bus voltage. To minimize losses during power factor correction (e.g., by the power factor correction circuitry 106 in FIG. 1) the DC bus voltage should be the minimum possible. The former of the two options above (i.e., corresponding to the boost mode operation) can be chosen. The range of possible DC bus voltage can depend on the type of the battery as well as other components. In some implementations, the range can extend from one voltage value to at least twice that voltage value. When the DC bus voltage has been chosen to be lower than the battery voltage, at least two options can be considered. First, $V_{DC}<<V_{bat}$, which corresponds to an extreme boost mode operation. This can involve a higher root mean square (RMS) value of the inductor current, and a lowest switching loss. Second, $V_{DC}<V_{bat}$, which corresponds to a normal boost mode operation. This can involve a lower RMS value of the inductor current, and a higher switching loss. That is, the lookup table 1600 can include first values associated with the extreme boost mode where a voltage gain is in a first range. As another example, the lookup table 1600 can include second values associated with the normal boost mode where the voltage gain is in a second range, the second range lower than the first range. Thus, in the first option, when $I_{out}<<I_{o,th}$, the DC bus voltage can preferably (e.g., ideally) be chosen at the lower end of the range, so that $V_{DC}=V_{DC,min}$, corresponding to an extreme boost mode operation. On the other hand, in the second option, when $I_{out}<I_{o,th}$, the DC bus voltage can preferably (e.g., ideally) be chosen to range within the range, corresponding to a normal boost mode operation. A variable DC bus voltage control can be provided to track improved (e.g., maximum) efficiency operation as the battery voltage and battery current change during charging/discharging. Such regulation solutions can have universal applicability to multiple different onboard chargers (e.g., different main power boards). As another example, the regulation can be universal to battery packs of different size. As another example, the regulation can be universally applicable to a charging mode and a discharging mode.

The sensed battery current can also be provided to a mixer 1514 that also receives a reference battery current value ($I_{bat,ref}$). The mixer 1514 can perform one or more operations on the sensed battery current and the reference battery current, such as a subtraction. The mixer 1514 can provide a result to a PI controller 1516. The PI controller 1516 can generate a control output that is here labeled $PI_{out}$.

The flowchart 1500 also shows a DAB modulator 1518. In some implementations, the DAB modulator 1518 operates based on dynamic modulation of PWM signals. For example, the DAB modulator 1518 can then be, or be substantially similar to, the modulator circuitry 206 in FIG. 2. In other implementations, the DAB modulator 1518 operates without performing dynamic modulation of PWM signals. For example, predefined PWM signals can then be used.

The DAB modulator 1518 can receive multiple inputs. Here, the DAB modulator 1518 receives the sensed battery voltage $V_{bat}$; a reference voltage for the DC bus, here labeled $V_{DC,ref}$; the control output $PI_{out}$ from the PI controller 1516; and a sensed DC bus voltage $V_{DC}$. Based on some or all of the inputs, the DAB modulator 1518 generates PWM signals 1520. For example, the PWM signals 1520 are provided to a DAB. The reference voltage $V_{DC,ref}$ can also be provided to a power factor correction (PFC) stage controller 1522.

Figures 17A, 17B:
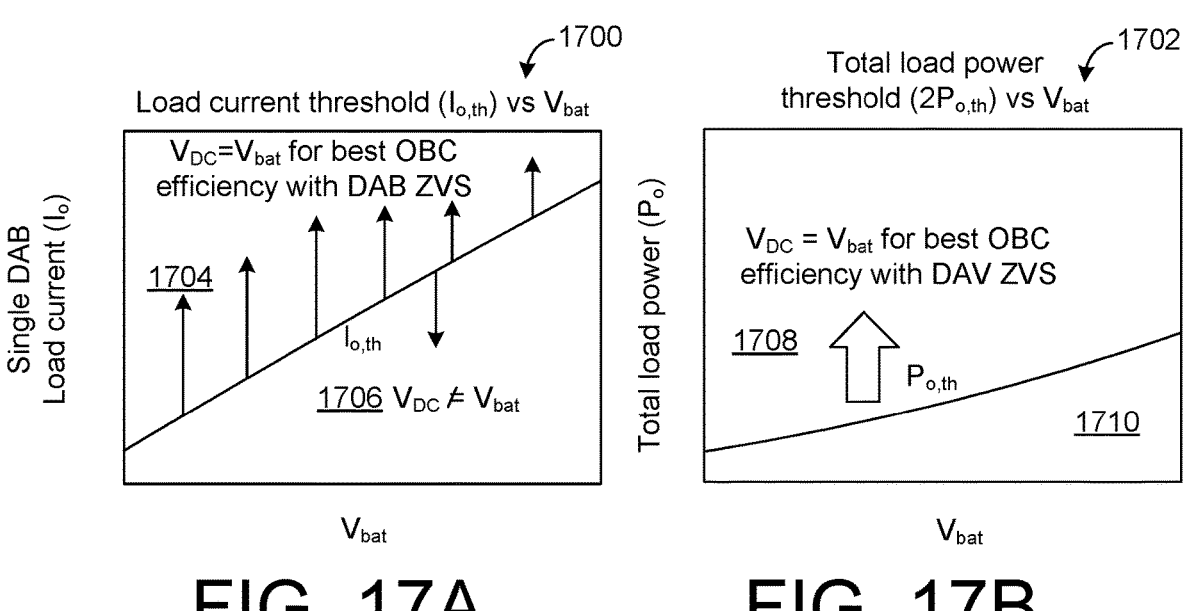
FIG. 17A shows an example of a graph with load current threshold versus battery voltage.
FIG. 17B shows an example of a graph with total load power threshold versus battery voltage.

FIG. 17A shows an example of a graph 1700 with load current threshold versus battery voltage. FIG. 17B shows an example of a graph 1702 with total load power threshold versus battery voltage. The graph 1700 and/or 1702 can be used with one or more other examples described elsewhere herein.

In seeking to improve efficiency by providing dynamic regulation of DC bus voltage, one can define the task of identifying the load power threshold ($P_{o,th}$) and/or load current threshold ($I_{o,th}$) beyond which the DC bus voltage should follow the battery voltage ($V_{DC}=V_{bat}$). If $P_{out}$ is more than a minimum transferred power in the state C of DAB modulation, then ZVS can be maintained while the DC bus voltage follows the battery voltage. The delivered power during buck mode operation in state C can be expressed as $$I_1 = I_{3,crit,C}\frac{V_2}{V_1} + \frac{D_2 T_s}{4L}(V_1 + V_2) - V_2\left(1 + \frac{V_2}{V_1}\right)\frac{T_2}{4L},$$

$$I_2 = I_{3,crit,C}\frac{V_2}{V_1} + \frac{T_s}{4L}(V_1 - V_2)\left(D_2 + \frac{V_2}{V_1}\right),$$

$$D_3 = \frac{2I_3 Lf_{sw}}{V_1} + \frac{1}{2}\left(D_2 - \frac{V_2}{V_1}\right), \text{ and}$$

$$P_o = \frac{V_1}{2}[(I_{3,crit,C} - I_1)D_3 + (I_2 + I_{3,crit,C})(D_2 - D_3)] = f(I_3, D_2).$$

A ZVS boundary condition for the state C can be expressed as $$I_3 = I_{3,crit,C} \text{ and } I_1 \geq I_{1,crit,C}, \text{ or}$$

$$D_2 \geq \frac{V_2}{V_1} + \left[I_{1,crit,C} - \frac{I_3 V_2}{V_1}\right] * \frac{4Lf_{sw}}{V_1 + V_2} = D_{2,min},$$

where the lower power limit can be expressed as $$P_{o,min,C} = P_o(I_{3,crit,C}, D_{2,min}).$$

The threshold power $P_{o,th}$ and threshold current $I_{o,th}$ can be expressed as $$P_{o,th} = P_{o,min,C} |_{V_1=V_2} =$$

$$V_2\left[I_{3,crit,C} - \frac{Lf_{sw}}{2V_2}\{(I_{1,crit,C} - I_{3,crit,C})^2 + 4(I_{3,crit,C})^2\}\right]|_{V_1=V_2},$$

wherein the ZVS critical switching currents in the state C (with $V_1=V_2$ or $V_{DC}=V_{bat}$) can be expressed as $$I_{1,crit,C} = \sqrt{\frac{4Q_A(V_2)V_2}{L}} \text{ and } I_{3,crit,C} = \sqrt{\frac{8Q_A(V_2)V_2}{L}}, \text{ and}$$

$$I_{o,th} = \frac{P_{o,th}}{V_2} = \sqrt{\frac{8Q_A(V_2)V_2}{L}} - 2Q_A(V_2)f_{sw}[(1-\sqrt{2})^2 + 8],$$

respectively, wherein $I_{o,th}$ is a function of the battery voltage and a switch capacitor parameter (e.g., a parameter of a MOSFET body capacitor).

The graph 1700 shows the load current on a vertical axis as a function of battery voltage on a horizontal axis. The threshold current $I_{o,th}$ is shown. A region 1704 reflects where the DC bus voltage is equal to the battery voltage (i.e., $V_{DC}=V_{bat}$). For example, this can provide the best onboard charger efficiency, with ZVS in the DAB. A region 1706 reflects where the DC bus voltage is not equal to the battery voltage (i.e., $V_{DC}\neq V_{bat}$).

The graph 1702 shows the total load power on a vertical axis as a function of battery voltage on a horizontal axis. The threshold power $P_{o,th}$ is shown. A region 1708 reflects where the DC bus voltage is equal to the battery voltage (i.e., $V_{DC}=V_{bat}$). For example, this can provide the best onboard charger efficiency, with ZVS in the DAB. A region 1710 reflects where the DC bus voltage is not equal to the battery voltage (i.e., $V_{DC}\neq V_{bat}$).

Figure 18:
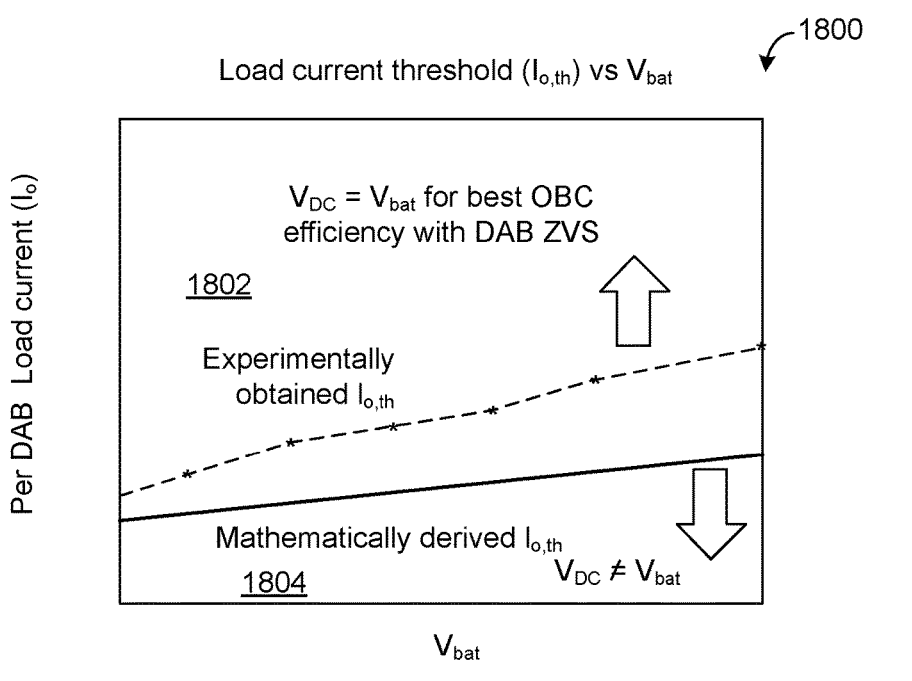
FIG. 18 shows an example of a graph with experimental and derived total load power threshold versus battery voltage.

FIG. 18 shows an example of a graph 1800 with experimental and derived total load power threshold versus battery voltage. The graph 1800 can be used with one or more other examples described elsewhere herein. The graph 1800 shows the load current per DAB on a vertical axis as a function of battery voltage on a horizontal axis. A mathematically derived threshold current $I_{o,th}$, and an experimentally obtained threshold current $I_{o,th}$, are shown. A region 1802 reflects where the DC bus voltage is equal to the battery voltage (i.e., $V_{DC}=V_{bat}$). For example, this can provide the best onboard charger efficiency, with ZVS in the DAB. A region 1804 reflects where the DC bus voltage is not equal to the battery voltage (i.e., $V_{DC}\neq V_{bat}$).

Figures 19A, 19B, 19C:
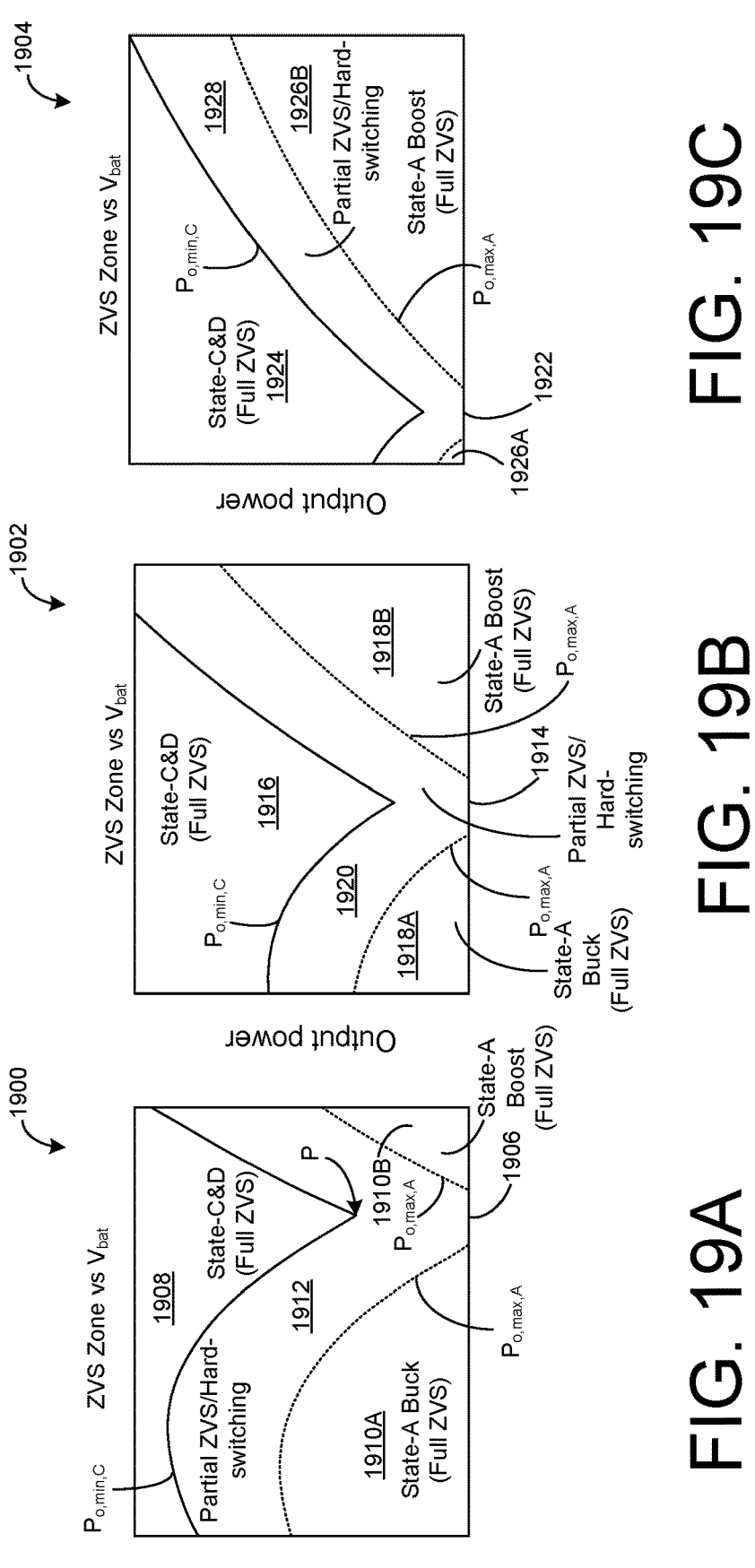
FIGS. 19A-19C show examples of graphs depicting zero-voltage switching (ZVS) zones.

FIGS. 19A-19C show examples of graphs 1900, 1902, and 1904 depicting zero-voltage switching (ZVS) zones. One or more of the graphs 1900, 1902, and 1904 can be used with one or more other examples described elsewhere herein. Each of the graphs 1900, 1902, and 1904 depicts output power on a vertical axis as a function of battery voltage on a horizontal axis, wherein the DC bus voltage is different in the three examples, as is mentioned below.

In the graph 1900, the DC bus voltage has a value 1906. For example, the value 1906 is towards or near an upper limit of the range of DC bus voltages. A $P_{o,min,C}$ curve represents a minimum power in a state C operation mode, and a $P_{o,max,A}$ curve represents a maximum power in a state A operation mode. Accordingly, the graph 1900 defines (by the $P_{o,min,C}$ curve) an area 1908 where operation in either state C or state D occurs at full ZVS. If the battery voltage is at the value 1906, and the DC bus voltage is also at the value 1906, then any current greater than the power of a point P on the $P_{o,min,C}$ curve will have full ZVS. The point P can be considered a critical point, and the DC bus voltage can then be set to be the same. The graph 1900 also defines (by the $P_{o,max,A}$ curve) an area 1910A where operation in state A (buck mode) occurs at full ZVS. The graph 1900 also defines (by the $P_{o,max,A}$ curve) an area 1910B where operation in state A (boost mode) occurs at full ZVS. A band area 1912 is defined between the $P_{o,min,C}$ and $P_{o,max,A}$ curves. In the band area 1912, only partial ZVS/hard switching occurs.

In the graph 1902, the DC bus voltage has a value 1914. For example, the value 1914 is lower than the value 1906. A $P_{o,min,C}$ curve represents a minimum power in a state C operation mode, and a $P_{o,max,A}$ curve represents a maximum power in a state A operation mode. Accordingly, the graph 1902 defines (by the $P_{o,min,C}$ curve) an area 1916 where operation in either state C or state D occurs at full ZVS. The graph 1902 defines (by the $P_{o,max,A}$ curve) an area 1918A where operation in state A (buck mode) occurs at full ZVS. The graph 1902 also defines (by the $P_{o,max,A}$ curve) an area 1918B where operation in state A (boost mode) occurs at full ZVS. A band area 1920 is defined between the $P_{o,min,C}$ and $P_{o,max,A}$ curves. In the band area 1920, only partial ZVS/hard switching occurs. That is, by lowering the DC bus voltage from the value 1906 to the value 1914, the area of non-ZVS operation can change from the band area 1912 to the band area 1920.

In the graph 1904, the DC bus voltage has a value 1922. For example, the value 1922 is lower than both the values 1914 and 1906. A $P_{o,min,C}$ curve represents a minimum power in a state C operation mode, and a $P_{o,max,A}$ curve represents a maximum power in a state A operation mode. Accordingly, the graph 1904 defines (by the $P_{o,min,C}$ curve) an area 1924 where operation in either state C or state D occurs at full ZVS. The graph 1904 defines (by the $P_{o,max,A}$ curve) an area 1926A where operation in state A (buck mode) occurs at full ZVS. The graph 1904 also defines (by the $P_{o,max,A}$ curve) an area 1926B where operation in state A (boost mode) occurs at full ZVS. A band area 1928 is defined between the $P_{o,min,C}$ and $P_{o,max,A}$ curves. In the band area 1928, only partial ZVS/hard switching occurs. By lowering the DC bus voltage to the value 1922 from the value 1906 (or from the value 1914), the area of non-ZVS operation can change to the band area 1928 from the band area 1920 (or from the band area 1912).

The graphs 1900, 1902, and 1904 show that a higher DC bus voltage will provide a bigger band area where non-ZVS occurs. This can be due to the greater amount of ZVS current required to discharge the output capacitance of a switch (e.g., $C_{oss}$ of a MOSFET) in time. As a result, a broader power flow region can be formed where full ZVS is not attained. If the DC bus voltage were set equal to the battery voltage (i.e., $V_{DC}=V_{bat}$), this would result in the lowest level of conduction loss due to the flat DAB current profile, and also a lower switching loss. Modulation in the state C or D can start at the lowest load current or $P_{out}$ compared to an extreme buck or boost mode power conversion (e.g., $V_{DC}>V_{bat}$ or $V_{DC}<V_{bat}$). The best DAB efficiency can be obtained if $V_{DC}=V_{bat}$ when $P_{out}>P_{o,min,C}$. However, at lighter load $P_{out}<P_{o,min,C}$ ZVS is not attained and substantial switching loss can occur.

In some implementations, dynamic regulation of the DC bus voltage can be provided to address the above and/or other situations. This can provide a full-range ZVS operation of the DAB; can provide an improved light-load efficiency (e.g., for L1 charging, such as in a V2L operating mode) for a full $V_{bat}$ range, which can be achieved by varying the DC bus voltage ($V_{DC}+V_{bat}$) and thus avoiding the non-ZVS zone for a particular $V_{bat}$; and/or can provide an improved (e.g., the optimal) load efficiency across the DAB and power factor correction stages, which can be achieved if $V_{DC}=V_{bat}$ when $P_{out}>P_{o,min,C}$ or $I_{out}>I_{o,th}$. Accordingly, one can identify the load power ($P_{o,th}$)/load current threshold ($I_{o,th}$) beyond which the DC bus voltage should follow the battery voltage. One can identify a preferable (e.g., optimal) choice of $V_{DC}$ for a light load condition (i.e., $I_{out} < I_{o,th}$) where it is clear that $V_{DC}$ should not equal $V_{bat}$. In some implementations, by lowering the DC bus voltage to the value 1922 (in the graph 1904), the area 1924 provides a greater opportunity for ZVS operation than does the area 1908 (in the graph 1900).

Dynamic modulation of PWM signals (e.g., as described previously herein) can also or instead provide advantages. For example, one or more of the areas 1910A, 1910B, 1918A, 1918B, 1926A or 1926B, each of which is associated with ZVS operation, may not have existed without dynamic modulation of PWM signals. As such, those areas would otherwise correspond to non-ZVS operation. That is, at least one additional zone of ZVS operation can be attained. In operation, such a newly created ZVS area can be chosen (e.g., selected) for operation, and a non-ZVS area can be avoided.

Figure 20A:
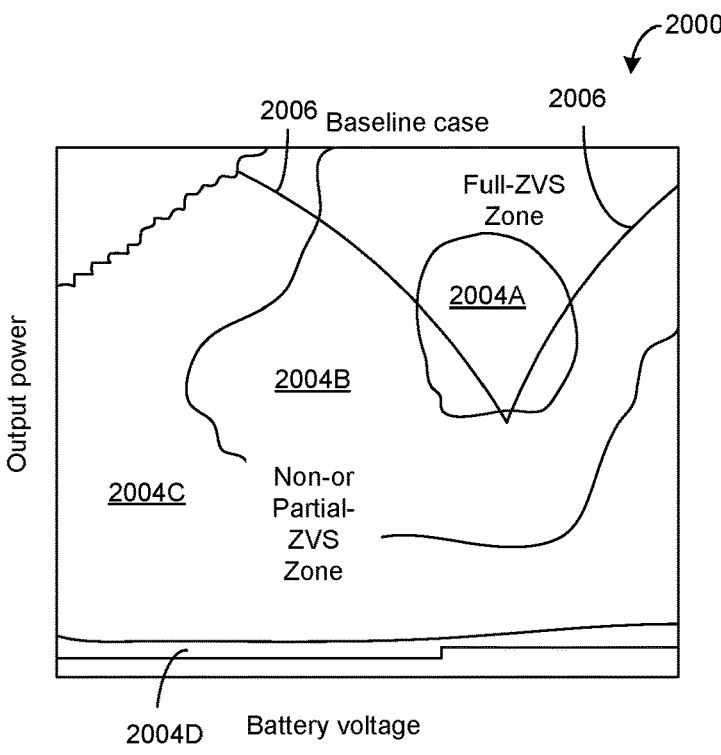
FIGS. 20A-20B show examples of graphs of efficiency for a baseline case.
Figure 20B:
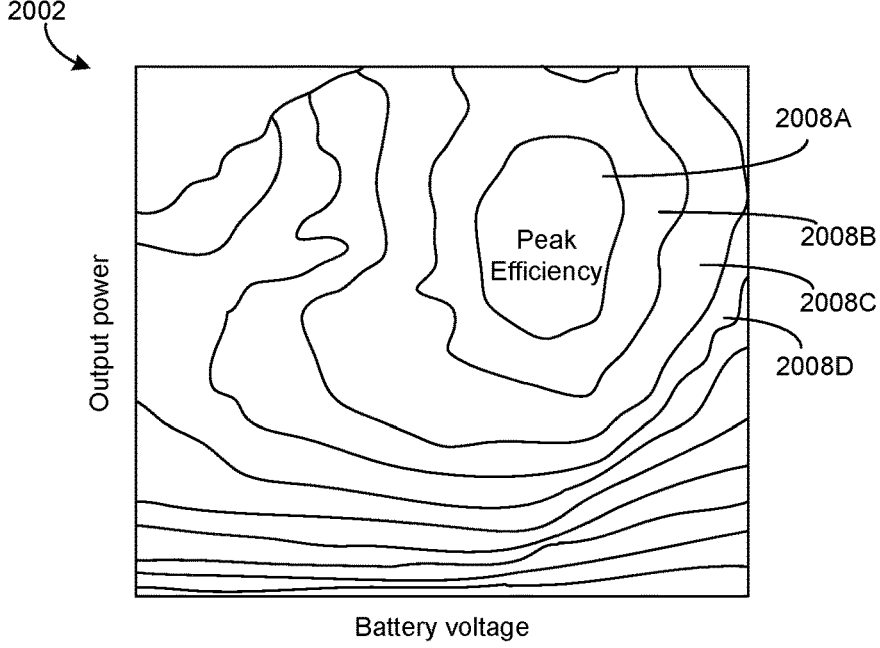

FIGS. 20A-20B show examples of a graph 2000 and a graph 2002 of efficiency for a baseline case. Either or both of the graphs 2000 or 2002 can be used with one or more other examples described elsewhere herein. The graph 2000 shows output power on a vertical axis as a function of battery voltage on a horizontal axis. In the graph 2000, the DC bus voltage has a value that is towards or near an upper limit of a range of DC bus voltages, and the graph 2000 can be characterized as a baseline case. Areas of different efficiency are indicated. For example, an area 2004A can correspond to a highest efficiency, an area 2004B can be an efficiency lower than that of the area 2004A, an area 2004C can be an efficiency lower than that of the area 2004B, and an area 2004D can be an efficiency lower than that of the area 2004C. A curve 2006 indicates which portion of the graph 2000 corresponds to ZVS. For example, the area 2004A is largely within the ZVS zone, and no part of the area 2004D is within the ZVS zone. In the graph 2000, only a single area (i.e., defined by the curve 2006) is a ZVS zone; this can be because no additional ZVS zone(s) had been created in the graph 2000 using dynamic modulation of PWM signals per the present disclosure.

The graph 2002 also shows output power on a vertical axis as a function of battery voltage on a horizontal axis. In the graph 2002, the DC bus voltage is the same as in the graph 2000. Areas of different efficiency are indicated. For example, an area 2008A can correspond to a highest efficiency (e.g., "peak efficiency"), an area 2008B can be an efficiency lower than that of the area 2008A, an area 2008C can be an efficiency lower than that of the area 2008B, and an area 2008D can be an efficiency lower than that of the area 2008C. Other levels of efficiency are also shown.

Figures 21A, 21B, 22A, 22B, 23A, 23B:
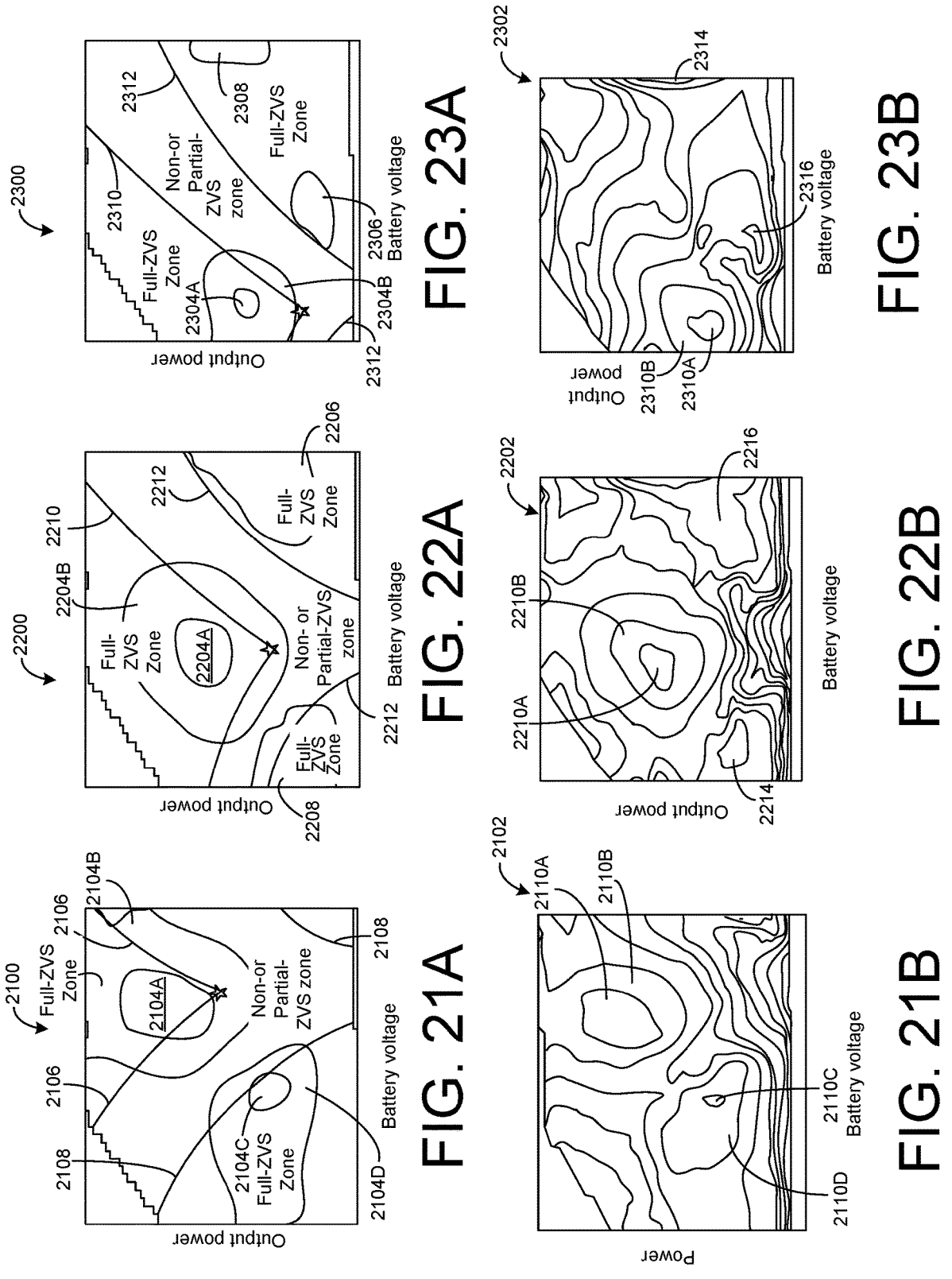
FIGS. 21A-21B show examples of graphs of efficiency for a first direct current (DC) bus voltage.
FIGS. 22A-22B show examples of graphs of efficiency for a second DC bus voltage.
FIGS. 23A-23B show examples of graphs of efficiency for a third DC bus voltage.

FIGS. 21A-21B show examples of a graph 2100 and a graph 2102 of efficiency for a first DC bus voltage. Either or both of the graphs 2100 or 2102 can be used with one or more other examples described elsewhere herein. The graph 2100 shows output power on a vertical axis as a function of battery voltage on a horizontal axis. In the graph 2100, the DC bus voltage has a value that is towards or near an upper limit of a range of DC bus voltages. Areas of different efficiency are indicated. For example, an area 2104A can correspond to a high efficiency, and an area 2104B can be an efficiency lower than that of the area 2104A. As another example, an area 2104C can correspond to a high efficiency, and an area 2104D can be an efficiency lower than that of the area 2104C. Curves 2106 and 2108 indicate which portions of the graph 2100 correspond to ZVS. For example, the areas 2104A and 2104C are largely within the ZVS zone. That is, in the graph 2100, additional ZVS zones have been created by a dynamic modulation compensation technique per the present disclosure.

The graph 2102 also shows output power on a vertical axis as a function of battery voltage on a horizontal axis. The graph 2102 shows an efficiency improvement by using a dynamic modulation compensation technique of the present subject matter. In the graph 2102, the DC bus voltage is the same as in the graph 2100. Areas of different efficiency are indicated. For example, an area 2110A can correspond to a higher efficiency, and an area 2110B can be an efficiency lower than that of the area 2110A. As another example, an area 2110C can correspond to a higher efficiency, and an area 2110D can be an efficiency lower than that of the area 2110C. For example, the area 2110C of high efficiency can be created as a result of the dynamic modulation compensation technique. Other levels of efficiency are also shown.

FIGS. 22A-22B show examples of a graph 2200 and a graph 2202 of efficiency for a second DC bus voltage. Either or both of the graphs 2200 or 2202 can be used with one or more other examples described elsewhere herein. The graph 2200 shows output power on a vertical axis as a function of battery voltage on a horizontal axis. In the graph 2200, the DC bus voltage has a value that is towards a middle of a range of DC bus voltages, and lower than the DC bus voltage in FIGS. 21A-21B. Areas of different efficiency are indicated. For example, an area 2204A can correspond to a high efficiency, and an area 2204B can be an efficiency lower than that of the area 2204A. As another example, areas 2206 and 2208 can correspond to relatively high efficiencies. Curves 2210 and 2212 indicate which portions of the graph 2200 correspond to ZVS. For example, the areas 2204A, 2206 and 2208 are largely within the ZVS zone. That is, in the graph 2200, additional ZVS zones have been created by a dynamic modulation compensation technique per the present disclosure.

The graph 2202 also shows output power on a vertical axis as a function of battery voltage on a horizontal axis. In the graph 2202, the DC bus voltage is the same as in the graph 2200. Areas of different efficiency are indicated. For example, an area 2210A can correspond to a higher efficiency, and an area 2210B can be an efficiency lower than that of the area 2210A. As another example, areas 2214 and 2216 can correspond to relatively high efficiencies. Other levels of efficiency are also shown.

FIGS. 23A-23B show examples of a graph 2300 and a graph 2302 of efficiency for a third DC bus voltage. Either or both of the graphs 2300 or 2302 can be used with one or more other examples described elsewhere herein. The graph 2300 shows output power on a vertical axis as a function of battery voltage on a horizontal axis. In the graph 2300, the DC bus voltage has a value that is towards a lower limit of a range of DC bus voltages, and lower than the DC bus voltage in FIGS. 22A-22B. Areas of different efficiency are indicated. For example, an area 2304A can correspond to a high efficiency, and an area 2304B can be an efficiency lower than that of the area 2304A. As another example, areas 2306 and 2308 can correspond to relatively high efficiencies. Curves 2310 and 2312 indicate which portions of the graph 2300 correspond to ZVS. For example, the areas 2304A, 2306 and 2308 are within the ZVS zone. That is, in the graph 2300, additional ZVS zones have been created by a dynamic modulation compensation technique per the present disclosure.

The graph 2302 also shows output power on a vertical axis as a function of battery voltage on a horizontal axis. In the graph 2302, the DC bus voltage is the same as in the graph 2300. Areas of different efficiency are indicated. For example, an area 2310A can correspond to a higher efficiency, and an area 2310B can be an efficiency lower than that of the area 2310A. As another example, areas 2314 and 2316 can correspond to relatively high efficiencies. Other levels of efficiency are also shown.

Figure 24B:
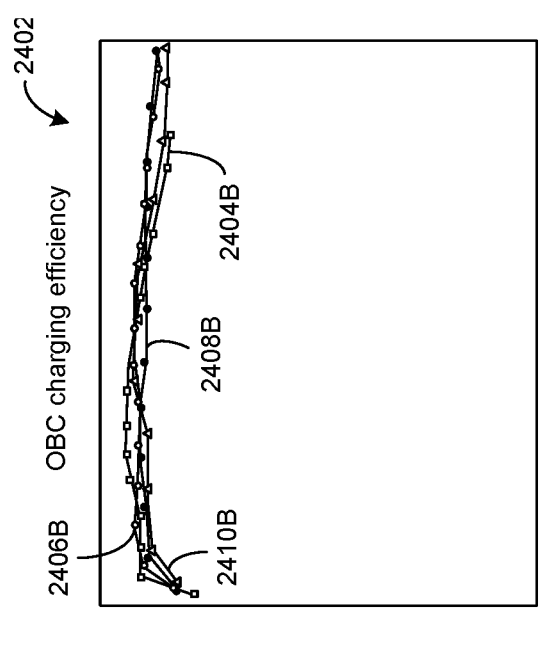
FIG. 24B shows an example of a graph with charging efficiency of an OBC of an implementation of the present subject matter.
Figure 24A:
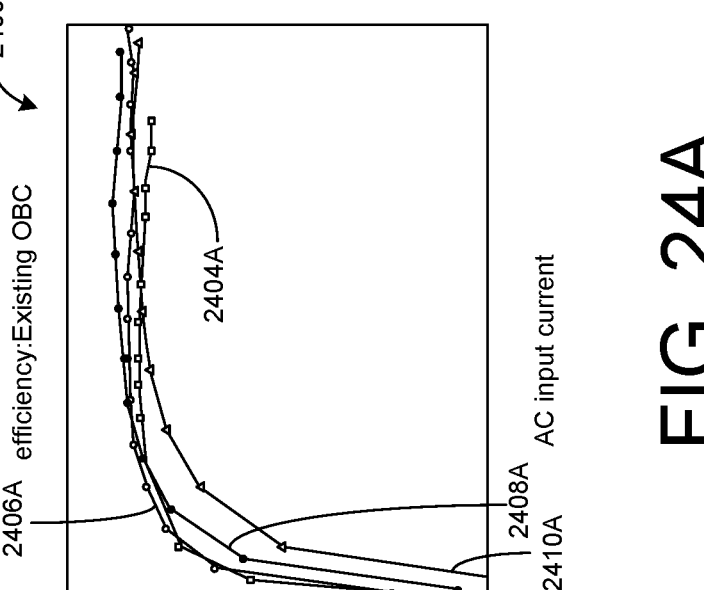
FIG. 24A shows an example of a graph with benchmark efficiency of an OBC.

FIG. 24A shows an example of a graph 2400 with benchmark efficiency of an OBC. FIG. 24B shows an example of a graph 2402 with charging efficiency of an OBC of an implementation of the present subject matter. The graph 2402 can be used with one or more other examples described elsewhere herein.

Both of the graphs 2400 and 2402 show OBC efficiency on a vertical axis as a function of AC input current on a horizontal axis. The scale is the same in the graphs 2400 and 2402. The graph 2400 shows a curve 2404A for the efficiency at a first battery voltage at or near a lower limit of a battery voltage range, a curve 2406A for the efficiency at a second battery voltage greater than the first battery voltage, a curve 2408A for the efficiency at a third battery voltage greater than the second battery voltage, and a curve 2410A for the efficiency at a fourth battery voltage greater than the third battery voltage, the fourth battery voltage being at or near an upper limit of the battery voltage range.

The graph 2402 shows, using the same battery voltages as in the graph 2400, that the OBC efficiency can be improved using the present subject matter. The graph 2402 shows a curve 2404B for the efficiency at the first battery voltage, a curve 2406B for the efficiency at the second battery voltage, a curve 2408B for the efficiency at the third battery voltage, and a curve 2410B for the efficiency at the fourth battery voltage. First, the curves 2404B, 2406B, 2408B, and 2410B reach higher efficiencies for many AC input currents that are never obtained using any of the curves 2404A, 2406A, 2408A, or 2410A. That is, the maximum attainable efficiency can be improved. Second, at the lowest levels of the AC input current, the curves 2404B, 2406B, 2408B, and 2410B avoid the sharp drops in efficiency characterizing the curves 2404A, 2406A, 2408A, and 2410A. That is, the minimum attainable efficiency can also or instead be improved.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A method comprising:

providing, in an onboard charger of an electric vehicle, a direct current (DC) to DC stage including a dual-active bridge (DAB) having switches arranged in multiple legs, each of the multiple legs controlled by a corresponding one of pulse width modulation (PWM) signals; and dynamically modulating the PWM signals to improve zero voltage switching (ZVS) in the onboard charger during a buck light load in which all of the switches are caused to operate with the ZVS, wherein dynamically modulating the PWM signals during the buck light load is based on phase shift parameters:

$$D_2 = PI_{out}$$

$$D_4 = \frac{2Lf_{sw}}{V_2}(I_3 - I_1) + \frac{V_1}{V_2}D_2$$

and $$D_3 = -\frac{2Lf_{sw}}{V_2}(I_1 + I_3)$$

where P is power, $I_{out}$ is an output current, L is inductance of the DAB, $f_{sw}$ is a switching frequency, $V_1$ and $V_2$ are primary and secondary voltages of the DAB respectively, and $I_1$ and $I_3$ are currents.

2. The method of claim 1, wherein dynamically modulating the PWM signals comprises changing phase shifts of the PWM signals.

3. The method of claim 1, wherein the method is performed as part of converting alternating current to DC for charging a battery onboard the vehicle.

4. The method of claim 1, wherein the method is performed as part of converting DC to AC for a power transfer operation selected from the group consisting of: a vehicle-to-load operation, a vehicle-to-home operation, a vehicle-to-grid operation, and a vehicle-to-vehicle operation.

5. The method of claim 1, wherein improving the ZVS comprises creating an additional ZVS zone within a voltage range of a battery of the vehicle.

6. The method of claim 5, wherein the onboard charger includes a DC link capacitor having a DC bus voltage, the method further comprising dynamically regulating the DC bus voltage to further improve the ZVS.

7. The method of claim 6, wherein dynamically regulating the DC bus voltage comprises ensuring that the DC bus voltage is within the additional ZVS zone.

8. The method of claim 1, wherein the onboard charger includes a DC link capacitor having a DC bus voltage, the method further comprising dynamically regulating the DC bus voltage to further improve the ZVS.

9. The method of claim 8, wherein dynamically regulating the DC bus voltage comprises performing a comparison of a sensed battery current with a battery current threshold, and selecting the DC bus voltage based on the comparison.

10. The method of claim 9, further comprising setting the battery current threshold before performing the comparison.

11. The method of claim 9, wherein if the comparison indicates that the sensed battery current is greater than the battery current threshold, selecting the DC bus voltage comprises setting the DC bus voltage equal to a battery voltage.

12. The method of claim 9, wherein if the comparison indicates that the sensed battery current is equal to or lower than the battery current threshold, selecting the DC bus voltage comprises obtaining the DC bus voltage from a lookup table.

13. The method of claim 12, wherein the lookup table is a two-dimensional table organized according to respective values of i) the sensed battery current or battery power, and ii) a battery voltage.

14. The method of claim 1, further comprising dynamically modulating the PWM signals to improve the ZVS in the onboard charger during a boost light load in which all of the switches are caused to operate with the ZVS, wherein dynamically modulating the PWM signals during the boost light load is based on phase shift parameters:

$$D_2 = PI_{out} + (I_1 + I_4)\frac{2Lf_{sw}}{V_1}$$

$$D_4 = PI_{out}$$

and $$D_3 = \left(1 - \frac{V_1}{V_2}\right)PI_{out} + \frac{2Lf_{sw}}{V_2}(I_1 - I_4)$$

where $I_4$ is a current.

15. An onboard charger for a vehicle, the onboard charger comprising:

a direct current (DC) to DC stage comprising:

a dual-active bridge (DAB) having switches arranged in multiple legs, each of the multiple legs controlled by a corresponding one of pulse width modulation (PWM) signals; and modulator circuitry for the dual-active bridge, the modulator circuitry configured to dynamically modulate the PWM signals to improve zero voltage switching (ZVS) in the onboard charger during a buck light load in which all of the switches are caused to operate with the ZVS, wherein dynamically modulating the PWM signals is based on phase shift parameters:

$$D_2 = PI_{out}$$

$$D_4 = \frac{2Lf_{sw}}{V_2}(I_3 - I_1) + \frac{V_1}{V_2}D_2$$

and $$D_3 = -\frac{2Lf_{sw}}{V_2}(I_1 + I_3)$$

where P is power, $I_{out}$ is an output current, L is inductance of the DAB, $f_{sw}$ is a switching frequency, $V_1$ and $V_2$ are primary and secondary voltages of the DAB respectively, and $I_1$, $I_2$ and $I_3$ are currents.

16. The onboard charger of claim 15, wherein modulator circuitry dynamically modulates the PWM signals by changing phase shifts of the PWM signals.

17. The onboard charger of claim 15, further comprising:

a DC link capacitor having a DC bus voltage; and regulator circuitry configured to dynamically regulate the DC bus voltage to further improve the ZVS.

18. The onboard charger of claim 17, wherein the regulator circuitry dynamically regulates the DC bus voltage by performing a comparison of a sensed battery current with a battery current threshold, and selecting the DC bus voltage based on the comparison.

19. The onboard charger of claim 18, wherein if the comparison indicates that the sensed battery current is greater than the battery current threshold, the regulator circuitry sets the DC bus voltage equal to a battery voltage.

20. The onboard charger of claim 17, wherein in a discharging mode of the onboard charger the regulator circuitry comprises the dual-active bridge.

21. The onboard charger of claim 17, further comprising power factor correction circuitry, wherein in a charging mode of the onboard charger the regulator circuitry comprises the power factor correction circuitry.

* * * * *